US007163325B2

(12) United States Patent
Kojima et al.

(10) Patent No.: US 7,163,325 B2
(45) Date of Patent: Jan. 16, 2007

(54) ROAD INDICATION DEVICE

(75) Inventors: Hiroyuki Kojima, Kanagawa (JP); Tomoko Ishiwata, Kanagawa (JP); Takashi Ichijo, Kanagawa (JP); Kozo Ogawa, Kanagawa (JP); Yasuharu Takano, Kanagawa (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 113 days.

(21) Appl. No.: 10/847,762

(22) Filed: May 17, 2004

(65) Prior Publication Data

US 2005/0002203 A1 Jan. 6, 2005

(30) Foreign Application Priority Data

| | | |
|---|---|---|
| May 20, 2003 | (JP) | 2003-142006 |
| Jun. 16, 2003 | (JP) | 2003-170710 |
| Jun. 17, 2003 | (JP) | 2003-172358 |
| Sep. 29, 2003 | (JP) | 2003-338315 |
| Jan. 22, 2004 | (JP) | 2004-014644 |

(51) Int. Cl.
*B60Q 1/26* (2006.01)
*F21V 7/00* (2006.01)
*F21S 8/00* (2006.01)

(52) U.S. Cl. ...................... 362/540; 362/296; 362/431

(58) Field of Classification Search ................ 362/296, 362/299, 335, 410, 431, 102
See application file for complete search history.

(56) References Cited

U.S. PATENT DOCUMENTS 6,739,741 B1 * 5/2004 Awa .......................... 362/431

FOREIGN PATENT DOCUMENTS

| | | | |
|---|---|---|---|
| JP | 2001093303 | * | 4/2001 |
| JP | 2002-201617 | | 7/2002 |
| JP | 2004-44336 | | 2/2004 |

* cited by examiner

*Primary Examiner*—Renee Luebke
*Assistant Examiner*—Evan Dzierzynski
(74) *Attorney, Agent, or Firm*—J.C. Patents

(57) ABSTRACT

A road indication device is provided. The road-guidance indicating device has a light projection unit including light control means for controlling a lamp and light emitted from the lamp. The light projection unit project a light whose peak luminosity is 30000 cd or more, i.e., the light has a luminosity equal to or larger than a peak luminosity of a headlight of a car running on the road. Since a light pillar of light having a high light output and a thick light pillar is projected from the light projection unit, the visuality of the light pillar is improved even in the bad weather and the boundary between the driveway and the shoulder on the road can be affirmatively guided and indicated.

8 Claims, 15 Drawing Sheets

ROAD INDICATION DEVICE

CROSS-REFERENCE TO RELATED APPLICATION

This application claims the priority benefit of Japanese application serial no. 2003-142006, 2003-170710, 2003-172358, 2003-338315 & 2004-014644, respectively filed on May 20, 2003, Jun. 16, 2003, Jun. 17, 2003, Sep. 29, 2003 & Jan. 22, 2004.

BACKGROUND OF THE INVENTION

1. Field of the Invention

This invention relates in general to a road indication device for guiding and indicating positions on the road by light.

2. Description of Related Art

Generally, the road lamps for illuminating the road are lit according to the surrounding brightness to illuminate a predetermined range of the road. However, when the weather is bad such as snowfall, etc., the snow under the covered area of the road lamp is irradiated to create a light curtain, so that disability glare might occur.

In addition, at snowbound area, when the boundary between the road and the shoulder is buried by the fallen snow, the boundary might not be distinct. Therefore, arrow signs are used to indicate the boundary of the road for warning the drivers. In this way, a driver who drives a car can be made aware of the boundary of the road by the arrow signs arranged at a predetermined distance along the road while driving the car. However, when the weather is bad such as snowstorm, the visbility of the arrow sign is decreased, sufficient guiding indication is impossible.

Japanese Laid Open No. 2002-201617 (FIGS. 1–2, pages 2–3) discloses a method of setting the arrow sign and a laser irradiation device together. The leaser beam from the laser irradiation device is adapted for irradiating the boundary of the road. Since the laser beam irradiates the snow, the irradiated portion from the laser irradiation device to the road can be seen as a single light ray to guide and indicate the boundary of the road.

However, at least the inventor of the present invention does not know that using such laser beam to perform the guidance and indication during the bad weather such as the snowfall has not been implemented in practice. According to the study conducted by the inventor of the present invention, irradiating the laser beam from the laser irradiation device to the boundary of the road cannot obtain sufficient visibility in the bad weather such as the snowstorm because the light output of the laser beam is small and the laser beam is thin. In addition, the color of the laser beam is restricted and a suitable color for better visibility cannot be selected. Therefore, there is a problem that the degree of freedom of selecting the light color is small.

To obtain a light with sufficient visibility in the bad weather, such as, the snowfall using the laser beam, a huge laser device is required and therefore expensive. Therefore, it is very difficult to set the laser device providing sufficient light together with the arrow sign on the road. In addition, because the laser irradiation device is set outdoors, people might gaze the laser irradiation device and thereby adversely affecting human eyes.

SUMMARY OF THE INVENTION

According to the foregoing description, an object of this invention is to provide a road indication device and an irradiation device capable of improving the visibility in the bad weather for precisely guiding and indicating the position of the road.

In order to achieve the object mentioned above, the present invention provides a road indication device. The road indication device comprises a light projection unit having a lamp and an optical device, for projecting a light of the lamp to a road, wherein a peak luminosity of the light is equal to or larger than 30000 cd.

According to the above embodiment of the present invention, the light of the lamp is condensed onto the road by a lens and a reflection mirror serving as light control means, and an opening. Alternatively, by using a lamp having large light beam, a light with a peak luminosity of 30000 cd or more is projected from the light projection unit. Namely, by projecting a light with a peak luminosity equal to or larger than the peak luminosity of the headlight of the car running on the road, the light output can be easily large and a thick light pillar can be formed. Furthermore, since the degree of freedom for selecting the color of the light is large, the visibility of the light pillar in the bad weather can be accordingly improved. In addition, a high brightness discharge lamp, a halogen bulb, etc. can be used as the lamp, and therefore, the road indication device can be inexpensive and compact compared with the conventional laser irradiation device.

In the above road-guidance indicating device, a ½-beam angle of the light projected from the light projection unit is equal to or less than 1°, and a ¹⁄₁₀-beam angle of the light projected from the light projection unit is equal to or less than 2°. The ½- or ¹⁄₁₀-beam angle is defined as the angle enclosed by two lines which intersect the candlepower distribution curve at the points where the candlepower is equal to ½ or ¹⁄₁₀ of its maximum (See the definition of "beam spread" in page 3–10 of the *IES Lighting Handbook*, $3^{rd}$ Edition, published by the Illuminating Engineering Society, 1860 Broadway, New York 23, N.Y., 1959).

In the present embodiment, by setting the ½-beam angle of the light projected from the light projection unit equal to or less than 1° and the ¹⁄₁₀-beam angle of the light projected from the light projection unit equal to or less than 2°, the light pillar can be clearly identified and the visibility can be improved.

Furthermore, a shortest length of an irradiation surface of the ¹⁄₁₀-beam angle of the light projected from the light projection unit is larger than or equal to 50 mm and less than or equal to 300 mm.

In the present embodiment of the present invention, the size of the cross section of the light projected from the light projection unit is set to the size of the ¹⁄₁₀-beam angle at the irradiation surface. The shortest length of the ¹⁄₁₀-beam angle is set to a diameter of a circular irradiation surface, a short side of a rectangular irradiation surface, or a minor axis of an elliptical irradiation surface.

If the shortest length is less than 50 mm, the cross section of the light is too thin, and the visibility in the bad weather becomes difficult. In addition, if the shortest length exceeds 300 mm, the power of the lamp will increase and the device volume will also increase, which is not very economic. Furthermore, by setting the shortest length to 100 mm to 300 mm, preferably 200 mm to 300 mm, a good visbility can be obtained.

A luminosity at 90 degrees with respect to a vertical direction of the light projected from the light projection unit is equal to or less than 10 cd per lamp beam 1000 lm, and a luminosity at 80 degrees with respect to the vertical direction is equal to or less than 30 cd per lamp beam 1000 lm.

In the present embodiment of the present invention, since the luminosity at 90 degrees with respect to a vertical direction of the light projected from the light projection unit is equal to or less than 10 cd per lamp beam 1000 lm, and the luminosity at 80 degrees with respect to the vertical direction is equal to or less than 30 cd per lamp beam 1000 lm, the occurrence of glare to the driver of the car running on the road can be suppressed.

The present invention further provides a road indication device. The road indication device comprises a light projection unit arranged above a boundary of a carrigeway, for projecting a light towards the carrigeway, wherein a peak luminosity of the light is equal to or larger than 30000 cd; and a light guiding device arranged at a light projection side of the light projection unit.

The light projection unit comprises a light source, and is capable of projecting light from a location above the road boundary toward the carrigeway. The light projection unit further comprises a reflection mirror, an opening and a lens, etc. for effectively irradiating the light emitted from the light source towards the carrigeway. If the irradiated light has a peak luminosity of about 30000 cd or more, the ½-beam angle of the light projected from the light projection unit is 1° or less and the ⅒-beam angle of the light projected from the light projection unit is 2° or less, the visibility for the driver can be improved in the bad weather. In addition, all types of light source, such as, a high pressure discharge lamp or a halogen lamp can be used as the light source of the present invention. However, point light source or the like can effectively irradiate the light. The road boundary is near a boundary between the driveway and the shoulder of the road.

The light guiding device utilizes a total reflection caused by a difference of refractive index between the air and material, and to the light is effectively guided to the target area. The optical fiber in the optical communication field and optical waveguide, etc. can be used as the light guiding device.

In this way, since the light irradiated from the light projection unit can be guided to the target area by the light guiding device, the light beam can be irradiated with an acute angle. In addition, if the light is also output from the side face of the light guiding device, the light guiding device glows together with the light beam, and therefore, the road boundary can be easily recognized. Furthermore, if an indication of such as "WATCH WHILE DRIVING" can be formed on the side face of the light guiding device in order to alert the driver.

The present invention further provides a road indication device. The road indication device comprises a light projection unit arranged above a boundary of a carrigeway, for projecting a light towards the carrigeway, wherein a peak luminosity of the light is equal to or larger than 30000 cd; and a reflection member arranged at a light projection side of the light projection unit.

In one embodiment of the present invention, the road indication device further comprises an arrow sign formed on the light projection unit.

The arrow sign can be set together with the light projection unit. In addition, a portion or all of the arrow sign can be formed by a light guiding material or a reflection material. The light projection unit can irradiate either a portion or all of the arrow sign. When the light projection unit irradiates the arrow sign, a strong light like a light beam can be irradiated in the snowstorm. According to an embodiment of the present invention, the brightness can be adjusted in a manner to only irradiate the arrow sign.

According to an embodiment of the present invention, both of the light beam and the arrow sign can glow, and therefore, the driver can easily identify the road boundary.

The present invention further provides a road indication device. The road indication device comprises a light projection unit arranged above a boundary of a carrigeway, for projecting a light towards the carrigeway; and a light control member arranged between the light projection unit and the carrigeway to prevent the light irradiated from the light projection unit to the carrigeway from reaching the carrigeway.

A light source is installed within the light projection unit and the light projection unit is capable of projecting light from a location above the road boundary toward the carrigeway. A reflection mirror, an opening and a lens, etc. are further installed within the light projection unit for effectively irradiating the light emitted from the light source towards the carrigeway. All kinds of light sources, such as, a high pressure discharge lamp or a halogen lamp, can be used as the light source of the light projection unit according to an embodiment of the present invention. However, point light source or the like can effectively irradiate the light. The road boundary is near a boundary between the driveway and the shoulder of the road.

The light control member is adapted for preventing the projection of the incident light directly from the light projection unit and the reflected light from reaching the carrigeway. The surface of the light control member where the light from the light projection unit is irradiated thereon can be a mirror surface for reflecting the light or a light shielding surface for absorbing the light.

The surface of the light control member where the light from the light projection unit is irradiated thereon can be formed with a color to serve as the light shielding surface to absorb the light. Black color or a color near to black color can be used as the color for absorbing the light. In this case, since the light from the light projection unit is shielded by the light control member, the leaked light reflected by the light control member can be properly prevented from reaching the carrigeway, and the occurrence of such as discomfort glare and disability glare due to the reflection light from the light control member can be effectively reduced.

According to an embodiment of the present invention, since the light from the light projection unit can be prevented from reaching the carrigeway by using the light control member, the occurrence of discomfort glare and disability glare, etc. can be effectively reduced when gazing the light projection unit from below.

In one embodiment of the above road indication device, a surface of the light control member facing the light projection unit is formed by a mirror surface for reflecting the light.

In the present embodiment of the present invention, the surface where the light from the light projection unit is irradiated thereon is formed with the mirror surface for reflecting the light towards the light projection unit side. In this case, a multicoated film or a filter for determining the color of the reflected light can be formed on the mirror surface of the light control member. In this way, since a color can be added to the light reflected by the light control member, the degree of color selection is large and accordingly a suitable color for improving the visibility can be selected. In addition, the light reflected by the light control member is irradiated parallel to the road or in a crossing direction of the road, and the color of the reflected light can be changed correspondingly for displaying signs, such as, pedestrian crossing, an intersection, a stop line, a railroad crossing, etc. at different locations. Therefore, these locations can be distinguished.

According to an embodiment of the present invention, since the light from the light projection unit is reflected towards the light projection unit, the light reflected by the light control member can be prevented from reaching the carrigeway, and the occurrence of discomfort glare and disability glare, etc. can be reduced. In addition, the road boundary can be clearly indicated because the amount of light between the light projection unit and the light control member is increased.

In one embodiment of the above road-guidance indicating device, the light control member is constructed in a manner that the light reflected by the light control member is irradiated parallel to the road or in a crossing direction of the road.

In an embodiment of the present invention, the light control member is constructed in a manner that the light reflected by the light control member is irradiated parallel to the road or in a crossing direction of the road. For example, irradiating the reflection light from the light control member to the crossing direction of the road can allow the people or drivers notice the locations of pedestrian crossing, an intersection, a stop line, a railroad crossing, etc. In addition, irradiating the reflected light from the light control member parallel to the road (the longitudinal direction of the road) can make the drivers notice the shape of the road, and therefore, a visual guiding effect can be expected.

According to an embodiment of the present invention, in addition to aforementioned effects, since the attention of the people or the drivers can be drawn to notice the locations of pedestrian crossing, an intersection, a stop line, a railroad crossing, etc., a more safer road guidance can be implemented. In addition, if the reflected light is irradiated parallel to the longitudinal direction of the road, a visual guiding effect can be expected.

In one embodiment of the above road-guidance indicating device, the light control member is installed at a height equal to or larger than 1.5 m from the carrigeway.

In one embodiment of the present invention, the light control member is installed at the position above 1.5 m from the carrigeway. The reason of setting the height above 1.5 m is that it is a range where the children's hands cannot reach. If the snowfall or the surrounding structure is generally 1.5 m or more, the children will not directly look at the high intensity portion of the beam center of the light source.

According to the present invention, the occurrence of discomfort glare and disability glare can be reduced because the children will not directly look at the high intensity portion of the beam center of the light source.

According to one embodiment of the invention, by using a lamp rather than the laser irradiation device, a light with a peak luminosity of 30000 cd or more is projected from the light projection unit. Namely, by projecting a light with a peak luminosity equal to or larger than the peak luminosity of the headlight of the car running on the road, the light output can be easily large and a thick light pillar can be formed. Furthermore, since the degree of color selection of the light is high, the visibility of the light pillar in the bad weather can be improved. In addition, since a lamp other than the laser light source is used, the light output is large and a thick light pillar can be formed, so that the road indication device can be inexpensive and compact. Therefore, the arrow sign can be set with the ordinary illumination apparatus on the road.

According to one embodiment of the invention, by setting the ½-beam angle of the light projected from the light projection unit equal to or less than 1° and the $1/10$-beam angle of the light projected from the light projection unit equal to or less than 2°, the light pillar can be clearly identified and the visibility can be improved.

According to one embodiment of the invention, by setting the shortest length of the irradiation surface of the $1/10$-beam angle of the light projected from the light projection unit larger than or equal to 50 mm and less than or equal to 300 mm, the visibility in the bad weather can be improved when the shortest length is less than 50 mm and the cross section of the light is too thin. In addition, it can also avoid a diseconomy when the shortest length exceeds 300 mm to increase the power of the lamp and the device volume. Furthermore, by setting the shortest length to 100 mm to 300 mm, preferably 200 mm to 300 mm, a good visibility can be obtained.

According to one embodiment of the present invention, since the luminosity at 90 degrees with respect to a vertical direction of the light projected from the light projection unit is equal to or less than 10 cd per lamp beam 1000 lm, and the luminosity at 80 degrees with respect to the vertical direction is equal to or less than 30 cd per lamp beam 1000 lm, the occurrence of glare to the driver of the car running on the road can be suppressed.

According to one embodiment of the present invention, the strong light beam irradiated from the light projection unit can be guided by the light guiding device. In this way, an acuter light beam can be irradiated towards the carrigeway. Therefore, even in the bad weather, the visibility of the light pillar can be improved and the position on the road can be affirmatively guided and indicated. In addition, if the side face of the light guiding device also glows, the road boundary can be easily indicated even in the stormy weather since the driver can identify the light guiding device.

According to one embodiment of the present invention, both of the light beam and the arrow sign can glow, and therefore, the driver can easily identify the road boundary.

According to one embodiment of the present invention, since the light from the light projection unit can be prevented from reaching the carrigeway by using the light control member, the occurrence of discomfort glare and disability glare, etc. when gazing the light projection unit from below can be effectively reduced.

According to one embodiment of the present invention, since the light from the light projection unit is reflected towards the light projection unit, the light reflected by the light control member can be prevented from reaching the carrigeway, and the occurrence of discomfort glare and disability glare, etc. can be reduced. In addition, the road boundary can be clearly indicated because the light amount between the light projection unit and the light control member is increased.

According to one embodiment of the present invention, since the attention of the people or the drivers can be drawn to notice the locations of pedestrian crossing, an intersection, a stop line, a railroad crossing, etc., a more safer road guidance can be implemented. In addition, if the reflection light is irradiated parallel to the longitudinal direction of the road, a visual guiding effect can be expected.

According to one embodiment of the present invention, the occurrence of discomfort glare and disability glare to the children can be reduced because the children will not directly look at the high intensity portion of the beam center of the light source.

BRIEF DESCRIPTION OF THE DRAWINGS

While the specification concludes with claims particularly pointing out and distinctly claiming the subject matter which is regarded as the invention, the objects and features of the invention and further objects, features and advantages thereof will be better understood from the following description taken in connection with the accompanying drawings.

DESCRIPTION OF THE PREFERRED EMBODIMENT

First Embodiment

Figure 1:
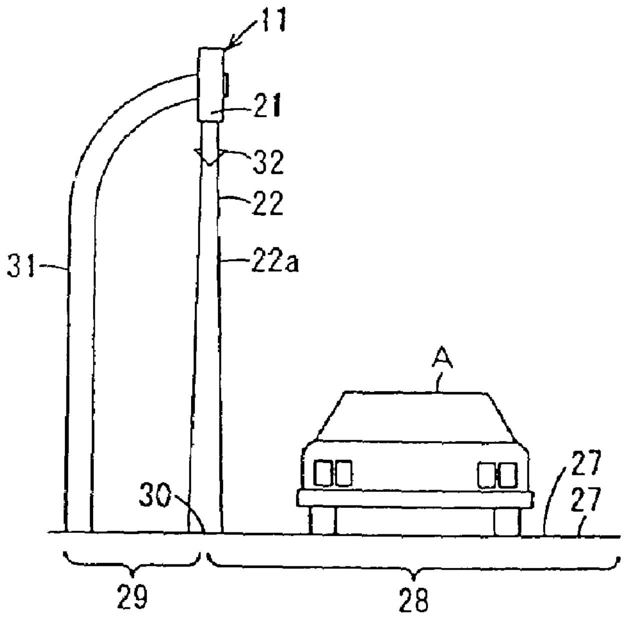
FIG. 1 is a diagram showing a use status of a road indication device according to the first embodiment of the present invention.
Figure 2:
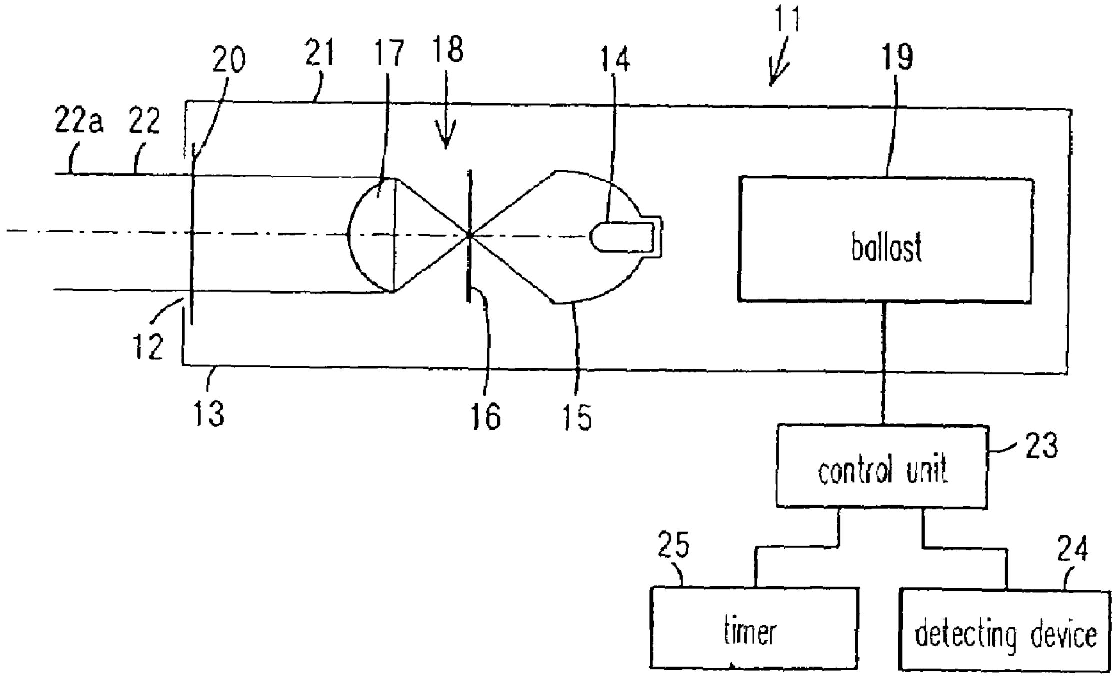
FIG. 2 is a structure diagram of the road indication device of FIG. 1.
Figure 3:
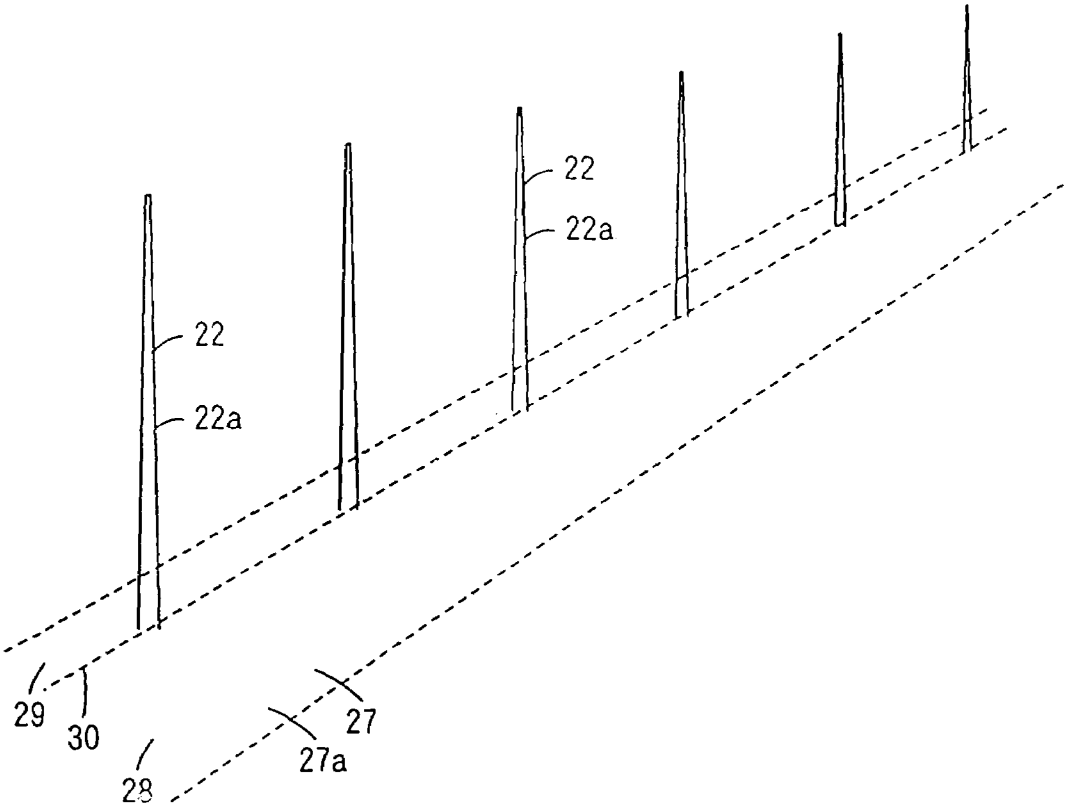
FIG. 3 is a diagram showing a use status of the road indication devices of FIG. 1. arranged on the road with a predetermined distance.
Figure 4:
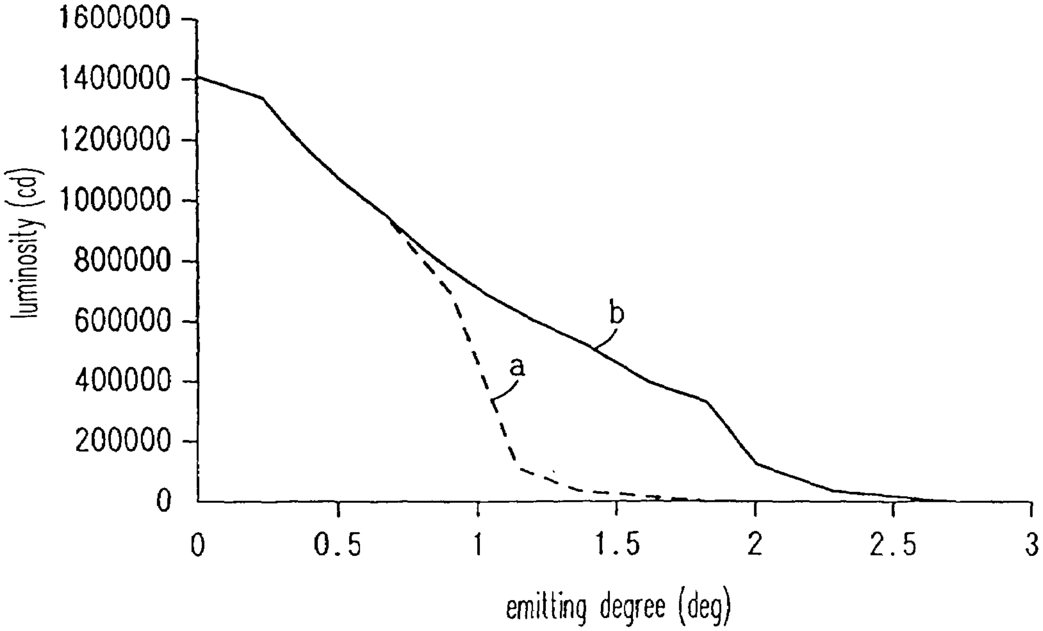
FIG. 4 is a graph showing a light distribution of the road indication device of FIG.1.
Figure 5:
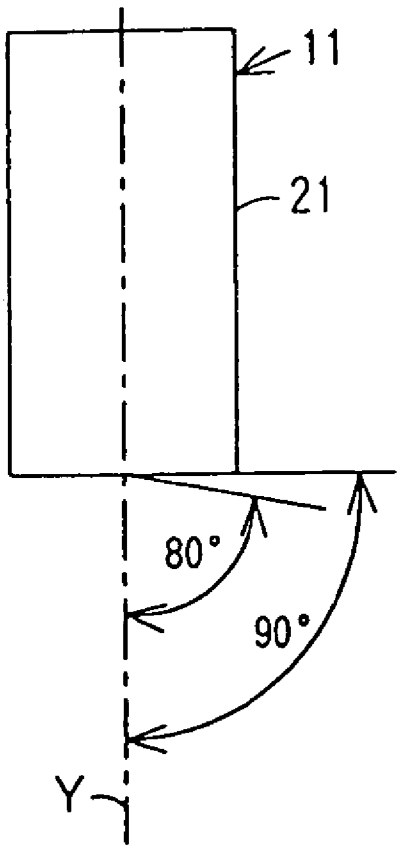
FIG. 5 is a diagram showing status at vertical angles of 90° and 80° relative to the vertical direction.

The embodiments according to the present invention will be described in detail accompanying with the attached drawings. FIG. 1 to FIG. 5 illustrate the views of a road indication device according to the first embodiment according to the invention. FIG. 1 is a diagram showing a use status of a road indication device, FIG. 2 is a block diagram showing a structure of the road indication device, FIG. 3 is a diagram showing a use status where the road indication devices are set at a predetermined distance on the road, FIG. 4 is a graph showing a light distribution of the road indication device, and FIG. 5 shows status at vertical angles of 90° and 80° relative to the road indication device.

As shown in FIG. 2, the road indication device 11 comprises a case 13 with a light projection opening 12 for projecting the light at one end along a light axis. A lamp 14, i.e., an HID (high intensity discharge) lamp such as a metal halide lamp, a halogen lamp, an ultra high pressure mercury (UHP) lamp with an electrode distance less than 1.5 mm is received in the case 13 and serves as a light source. An optical system 18 is further received in the case 13 and serves as light control means for controlling the light of the lamp 14. The optical system 18 comprises a reflection mirror 15 for focusing and reflecting the light from the lamp 14 along an axial direction of the light from the reflection mirror 15, and the aperture 16 for forming a circular opening at the focus of the reflection light reflected by the reflection mirror 15, and a lens 17 for condensing the light passing through the opening of the aperture 16 parallel with the light axial direction. Furthermore, a ballast (light control member) 19 is also included in the case 13 for serving as a lighting device to light the lamp 14. The light projection opening 12 of the case 13 is covered by a protection plate 20 with transmittance that is made of glass or resin. The light projection unit 21 is constructed to include the case and the optical system 18, and projects a light 22 having a peak brightness equal to or larger than 30000 cd. The color of the light 22 can be white or a color according to a background color.

The ballast 19 is controlled by the control unit 23, and the control unit 23 is adapted for controlling a light output, including turning on and off the lamp 14, according to the environment, such as snowfall, rainfall, fog and traffic, etc. For example, according to a detection result from the detecting device 24 that detects a snowfall amount (also for a rainfall amount and a fog density, etc.), the lamp 14 is usually turned on with a rated output when the snowfall amount exceeds a predetermined amount. The control units 23 can control the lamp 14 to reduce its light output when the snowfall amount decreases. This control scheme can be executed by a program set by beforehand experiments. In addition, for example, according to time information from the timer 25, the lamp 14 is usually lit from the evening to the midnight, and the lamp 14 is controlled according to the traffic volume and the time zone in a manner that the light output of the lamp 14 is reduced from the midnight to the morning when the traffic volume of cars, etc. becomes small. Furthermore, the detecting device 24 used in the environment detection can utilize an environment transmissometer. The laser beam is irradiated from the light projection unit 21 to the receiver, and the surrounding environment status, such as the snowfall amount, the rainfall amount and the fog density, etc. can be found from a ratio of the light amount reaching the receiver.

As shown in FIG. 1, the driveway 28 and the shoulder 29 are formed along a boundary 30 on the road 27. A plurality of posts 31 standing on the shoulder 29 at a predetermined interval whose tops are bent toward the driveway 28. A road indication device 11 for projecting a light to the boundary 30 on the pavement 27*a* of the road 27 is installed at the top end of each post 31, wherein a light projection opening 12 of the road indication device 11 is directed downwards. Furthermore, an arrow sign 32, i.e., a plate-shaped sign where an arrow is protruded from the lower end of the road guidance indicating device 11 and formed at the front end (or lower end with respect to the road 27) of road indicating device 11, is installed on the road indication device 11 or the post 31 at a position that is irradiated by a portion of the light 22 projected from the road-guidance indicating device 11. Namely, the arrow sign 32 is installed in a manner that a portion of the light 22 is irradiated to the plate surface opposite to the moving direction of the car A that runs on the road 27.

In cases other than the bad weather such as the snowfall, the rainfall and the fog, the visibility of the arrow sign 40 is still good, and the driver who drives the car A on the road 27 can confirm the boundary 30 between the road 27 and the shoulder 29 by the light pillars 22 of the light 22 formed with a predetermined distance along the road 27.

In the bad weather such as the snowfall, since the rainfall and the fog, the guiding indication is not sufficient by only the arrow sign 32, the lamp 14 of the road indication device 11 is lit. By lighting the lamp 14, the light of the lamp 14 is reflected by the reflection mirror 15. Then, the reflection light passes through the opening of the aperture 16 for cutting the expanse of the light 22 that expand to the surroundings, and then condensed by the lens 17 to a parallel light 2 in the axial direction. After passing through the light projection opening 12, the light 22 is projected towards the boundary 30 between the driveway 28 and the shoulder 29.

The projected light irradiates the snow in the snowfall, and the rain in the rainfall, and the fog, etc. and the snow, the rain and the fog glisten, which can be visible as one light pillar 22*a* of the light 22 from the road indication device 11 to the pavement 27*a* of the road 27. Therefore, as shown in FIG. 3, the driver who drives the car A on the road 27 can confirm the boundary between the road 27 and the shoulder 29 by the light pillars 22 of the light 22 formed with a predetermined distance along the road 27, while confirming the route of the road 27.

Since the luminosity of the light pillar 22*a* of the light 22 is equal to or larger than the peak luminosity of the headlight of the car A running on the road 27, the light pillar 22*a* of the light can be affirmatively confirmed even though the light of the headlight is irradiated to the light pillar 22*a* of the light 22.

FIG. 4 shows a relationship between the emitting angle and the luminosity of the light 22 projected from the light projection unit 21, i.e., the road-guidance indicating device 11, which is result measured by experiments under a snowfall environment. At this time, the peak luminosity is 1400000 cd. The opening of the aperture 16 for cutting the expanse of the light 22 that expands to the surrounding is ϕ2.5 mm for case (a), and ϕ5 mm for case (b).

For the case (a) that the opening of the aperture 16 is ϕ2.5 mm, a ½-beam angle, i.e., 1400000/2=700000 cd is 0.9° and a 1/10-beam angle, i.e., 1400000/10=140000 cd is 1.29°. In addition, for the case (b) that the opening of the aperture 16 is ϕ5 mm, a ½-beam angle, i.e., 1400000/2=700000 cd is 1.0° and a 1/10-beam angle, i.e., 1400000/10=140000 cd is 2.0°.

The light pillar 22*a* of the light 22 can be precisely identified by setting the ½-beam angle equal to or less than 1° and the 1/10-beam angle equal to or less than 2°. Namely, if the ½-beam angle is larger than 1° and the 1/10-beam angle is larger than 2°, the light pillar 22*a* of the light 22 cannot be precisely identified.

In this manner, the 1/10-beam angle is used as the diameter of the light pillar 22*a* of the light 22 to perform the experiment. For example, the light projection unit 21 of the road indication device 11 is installed at a height of 5 m from a irradiation surface of the road 27.

TABLE 1 shows the visibility of the light 22 under the snowfall condition when the 1/10-beam angle of a circular irradiation surface is set as the diameter and a distance between the road-guidance indicating devices 11 is 40 m, 60 m and 80 m.

The ϕ5 mm case is an example of using a laser beam like the conventional art. The diameter of the respective irradiation surface is set by changing the distance between the lens 17 and the lamp 14.

As shown in TABLE 1, the light pillar 22*a* of the light 22 cannot be recognized by a laser beam of ϕ5 mm, and light pillar 22*a* of the light 22 can be recognized by a laser beam of ϕ50 mm or more. A laser beam of ϕ100 to 300 mm is preferred, and a laser beam of ϕ200 to 300 mm is more preferable. In addition, as the diameter of the laser beam exceeds ϕ300 mm, the power consumption of the lamp 14 will increase and the device size will also increase, which is not very economic.

TABLE 1

| | ϕ5 mm | ϕ50 mm | ϕ100 mm | ϕ200 mm | ϕ300 mm |
|---|---|---|---|---|---|
| 40 m | X | ○ | ○ | ○ | ○ |
| 60 m | X | Δ | ○ | ○ | ○ |
| 80 m | X | Δ | Δ | ○ | ○ |

Furthermore, in the road indication device 11, the light distribution is controlled by the optical system of the projection unit 21 so as to suppress the occurrence of glare to a driver who drives the car A on the road 27. As shown in FIG. 5, when the light 22 is projected downwards from the light projection unit 21 in the vertical direction Y, the luminosity at 90-degree direction with respect to the vertical direction Y is 10 cd or less per lamp beam 1000 lm, and the luminosity at 80-degree direction with respect to the vertical direction Y is 30 cd or less per lamp beam 1000 lm. This is equivalent to a cut-off form luminosity of road illumination apparatus specified by JIS C8131, and can prevent the occurrence glare to the driver who drives the car A on the road 27.

For various lamps 14 with different lamp powers, peak brightness and electrode distances, a result of measuring a light utilization efficiency by experiments under a snowfall environment is shown in TABLE 2. The lamps 14 for comparison are ultrahigh pressure mercury lamp (UHP), ceramic metal halide lamp (CDM) and HID lamp for automobile.

| | UHP | CDM | HID lamp for automobile |
|---|---|---|---|
| lamp power [W] | 100 | 75 | 35 |
| peak luminosity [cd] | 1400000 | 50000 | 200000 |
| electrode distance [mm] | 1.2 | 4 or more | 4 |
| light utilization efficiency [cd/W] | 14000 | 1111 | 5714 |

According to the result in TABLE 2, one can confirm that the UHP lamp with an electrode distance equal to or less than 1.5 mm has a maximum light utilization efficiency. Therefore, by using the UHP lamp with an electrode distance equal to or less than 1.5 mm as the lamp 14, the visibility of the light pillar 22*a* of the light 22 can be improved. Furthermore, the power consumption (Watt) can be reduced by adjusting the light amount according to the weather.

As described above, according to the road indication device 11, by projecting a light whose peak brightness that the light of the lamp 14 is collimated by the lens 17 is 30000 cd or more, i.e., by projecting the light 22 whose peak brightness is higher than the peak brightness of the head light of the car A running on the road 27, the light pillar 22*a* can be formed with a high and thick light output, and the light pillar 22 of the light 22 can be exactly recognized even though the light of the head light of the car A irradiates to the light pillar 22*a* of the light 22. Therefore, the visibility of the light pillar 22*a* of the light 22 can be improved in the bad weather, and the position of the boundary 30 on the road 27 can be exactly indicated.

For example, the UHP lamp, the CDM lamp and the HID lamp for automobile can be used as the lamp 14 in the road-guidance indicating device 11, and therefore, the color of the light 22 can be selected in a manner that the light 22 can be easily recognized in the bad weather. Since the degree of freedom of selecting the light color is high, the visibility of the light pillar 22*a* of the light 22 can be improved in the bad weather, and the position of the boundary 30 on the road 27 can be precisely indicated. In this case, for example, the colors of the lamps 14 for the up and the down lines on the road 27 can be changed, and therefore, the up and the down lines on the road 27 can be easily recognized.

For example, during snowfall, the control unit 23 controls the lamp 14 to turn on with its rated output in usual way when the snowfall amount reaches a predetermined snowfall amount, and therefore, the visibility can be maintained. In addition, when the snowfall amount decreases, the light output of the lamp 14 will be reduced to save the energy.

Furthermore, the control unit 23 controls the lamp 14 according to a traffic condition and a time zone so that the lamp 14 is turned on in a usual way from the evening to the midnight and turned on from the midnight to the morning when the traffic volume is small. In this way, the energy consumption can be saved.

In particular, the lamp 14 of the road indication device 11 can be turned on only when the car A drives through a road on the mountain where the traffic is small, and thereby, the energy can be saved. This can be implemented by setting a car passing sensor in front of the road-guidance indicating device 11, for example detecting the car by the blockade of the infrared ray, the road-guidance indicating device 11 can be turned on only when the car passing sensor detects the car A passing through. At this time, a plurality of road indication devices 11 can be controlled by the car passing sensor, and the plurality of road indication devices 11 can be turned on according to the movement of the car A and a time difference.

TABLE 3

| | light output | |
|---|---|---|
| environment | usual output | reduced output |
| snowfall or rainfall amount | large | small |
| fog density | dense | thin |
| time zone | evening to midnight | might night to morning |
| traffic volume | large | small |

In addition, when the lamp 14 of the road indication device 11 is turned on, a portion of the projecting light 22 is irradiated to the surface of the arrow sign 32 and the surface of the arrow sign 32 shines. Therefore, the visibility can be further improved by using the light pillar 22*a* of the light 22 and the arrow sign 22.

Second Embodiment

Figure 6:
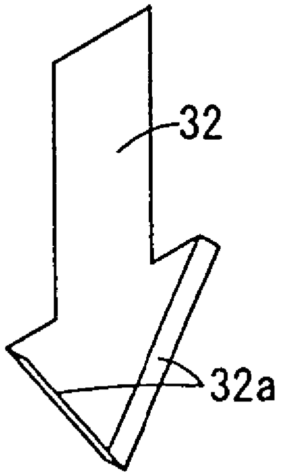
FIG. 6 is a perspective view showing an arrow sign that is used together with the road-guidance indicating device according to the second embodiment of the present invention.

FIG. 6 shows a road indication device according to the second embodiment of the present invention. As shown in FIG. 6, by bending a reflection portion 32*a* from the edges of an arrow portion at the lower end of the arrow sign 32 to a surface where the light 22 is irradiated there to, the reflection light reflected by the reflection portion 32*a* is irradiated to the surface of the arrow sign 32. As a result, the arrow sign 32 becomes brighter and the visibility can be further improved.

In addition, the light projection direction of the light 22 of the road indication device 11 can be constructed to alternatively move between the direction of the pavement 27*a* and the direction of the arrow sign 32 based on the time zone, etc. under the control of the control unit 23. For example, the light 22 of the road indication device 11 is usually projected towards the pavement 27*a* of the road 27, and projected towards the arrow sign 32 in the late-night time zone when the traffic is small, so that the light output by the lamp 14 can be reduced. In this manner, the visibility of the arrow sign 32 can be still maintained and the energy consumption can be also saved.

Third Embodiment

Figure 7:
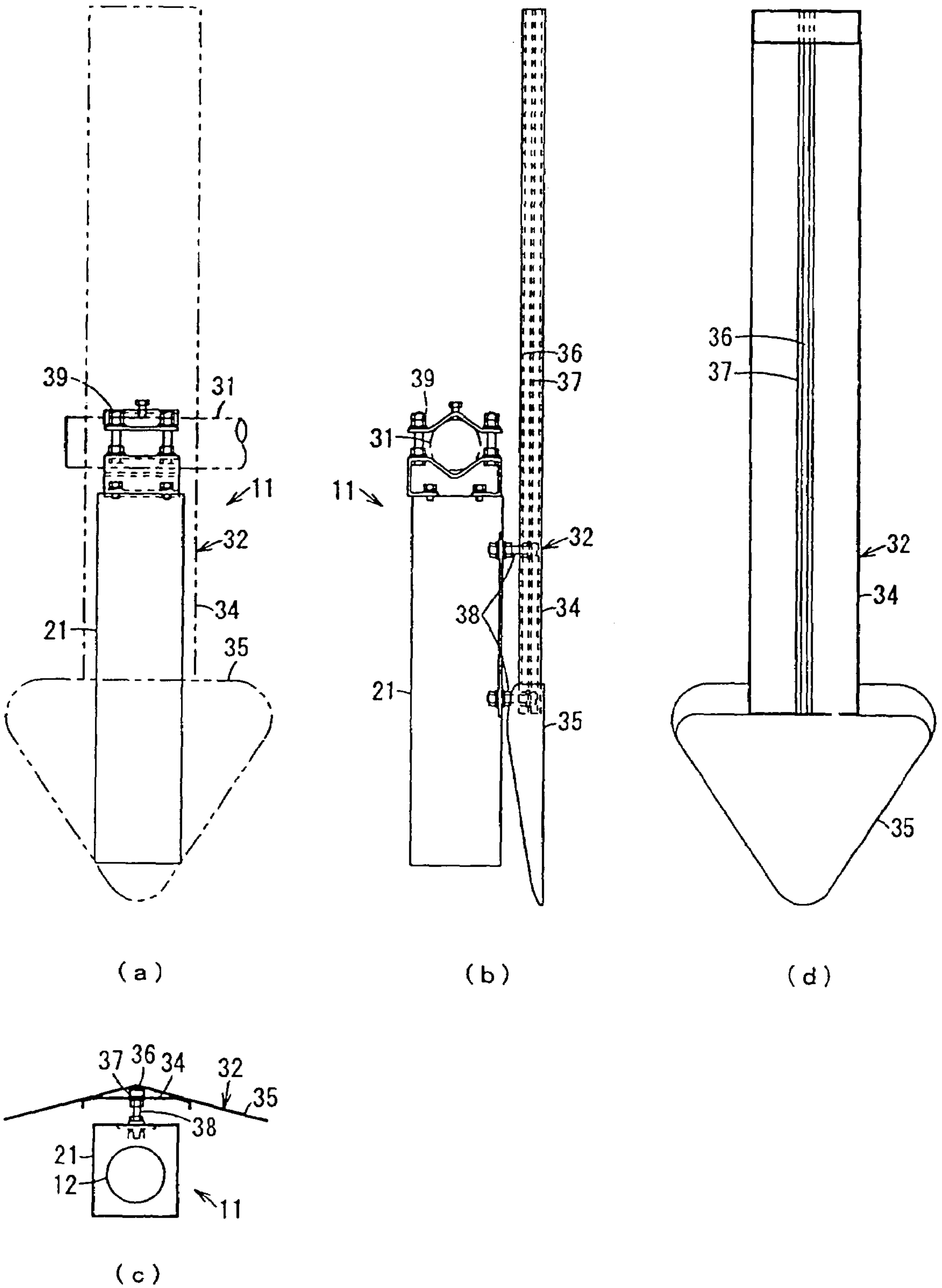
FIG. 7A to FIG. 7C are a front view, a side view and a bottom view of the road indication device according to the third embodiment of the present invention.
FIG. 7D is a back view of an arrow sign.

FIG. 7 shows a road indication device according to the third embodiment of the present invention. As shown in FIG. 7, the arrow sign 32 comprises a long base 34 extending in an up-and-down direction and a arrow portion 35 that is substantially triangular and connected to the lower end of the base 34. The long base 34 and the arrow portion 35 are bent to a convex surface that the central portion of the face opposite to the face where the light projection unit 21 is installed thereon is convex.

On the face where the light projection unit 21 of the base 34 is installed, a rail 27 with a groove 36 is installed along the up-and-down direction. Link means 38, including bolts, formed at two locations (up and down) on the side face of the light projection unit 21 is slidably engaged and fixed to the groove 36 of the rail 37. Therefore, the position of the arrow sign 32 can be adjusted up and down with respect to the light projection unit 21. Installation metal fittings 39 are installed at the upper end of the light projection unit 21 for mounting the light projection unit 21 to the post 31.

Fourth Embodiment

Figure 8:
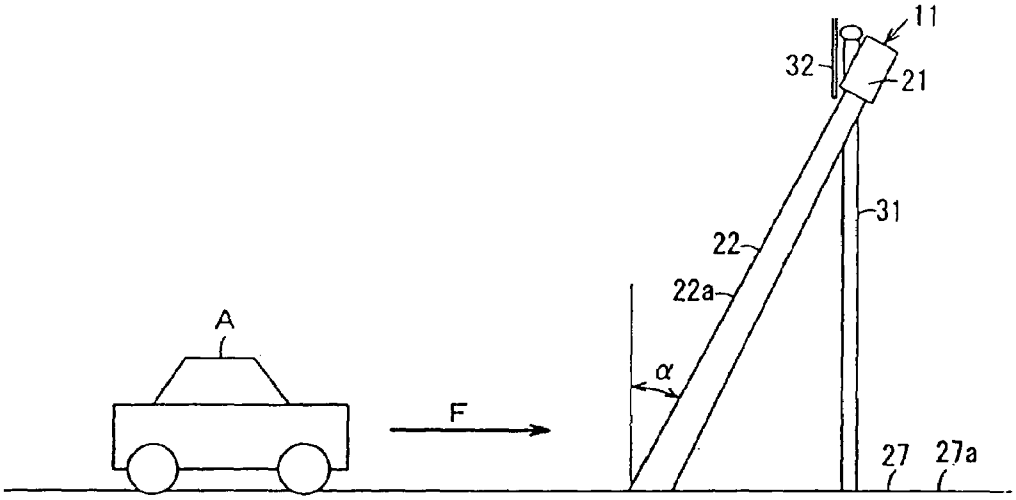
FIG. 8 is a diagram showing a use status of the road indication device according to the fourth embodiment of the present invention.

FIG. 8 shows a road indication device according to the fourth embodiment of the present invention. As shown in FIG. 8, the angle of the projection direction of projecting the light 22 from the light projection unit 21 is opposite to the moving direction F of the car A. Namely, by directing the light 22 towards the driver of the car A driving on the driveway 28, the brightness of the light pillar 22*a* of the light 22 seen by the driver can be increased, and therefore, the visibility can be improved. The angle $\alpha$ of the light 22 with respect to the pavement 27*a* of the road 27 is preferably set at a range of $0<\alpha<45°$. If the angle $\alpha$ is equal to or larger than 45°, the driver will feel dizzy.

Fifth Embodiment

Figure 9:
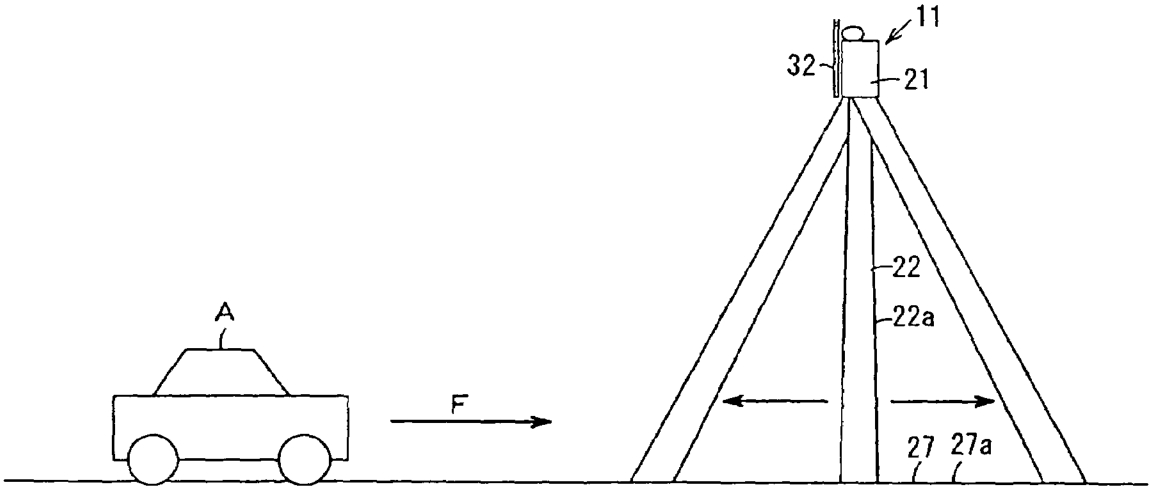
FIG. 9 is a diagram showing a use status of a road indication device according to the fifth embodiment of the present invention.

FIG. 9 shows a road indication device according to the fifth embodiment of the present invention. As shown in FIG. 9, the angle of the projection direction of projecting the light 22 from the light projection unit 21 is varied with a predetermined period corresponding to the moving direction F of the car A. In this way, the brightness and the position of the light pillar 22*a* of the light 22 seen by the driver are varied, and therefore, the visibility can be improved. Furthermore, since the light 22 can repeatedly move along the boundary 30 between the driveway 28 and the shoulder 29 and a wide range of the boundary 30 is irradiated, the boundary 30 can be easily identified by eyes.

Sixth Embodiment

Figure 10:
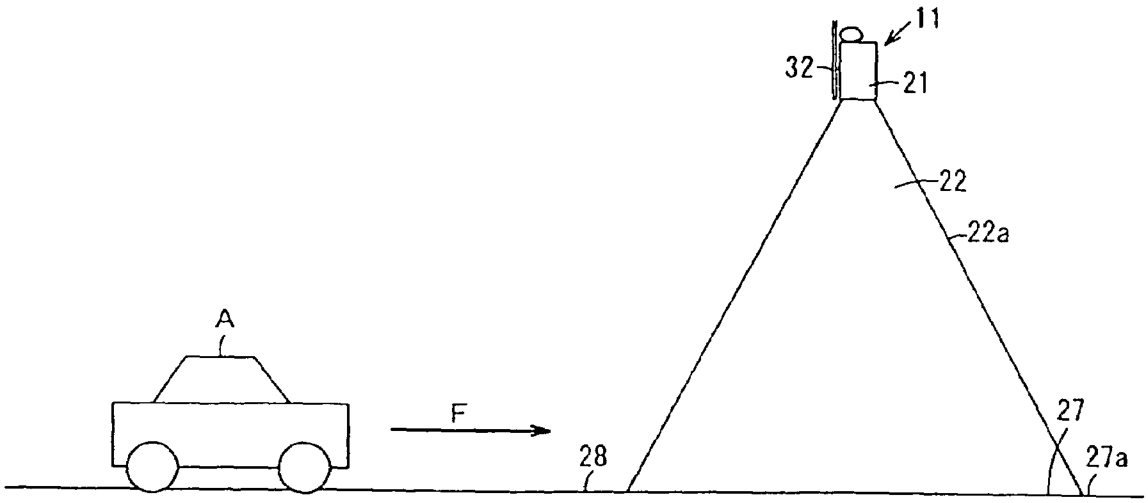
FIG. 10 is a diagram showing a use status of the road-guidance indicating device according to the sixth embodiment of the present invention.
Figure 11:
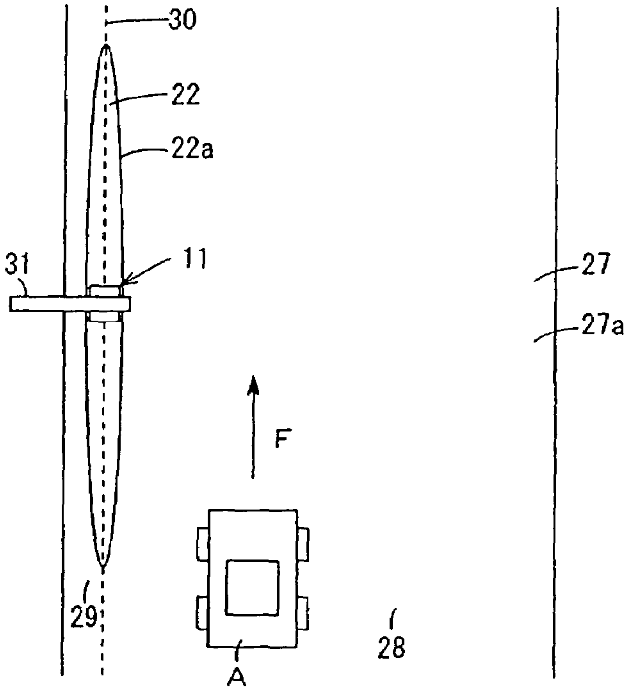
FIG. 11 is a plane diagram showing a use status of a road indication device according to an embodiment of the present invention.
Figure 12:
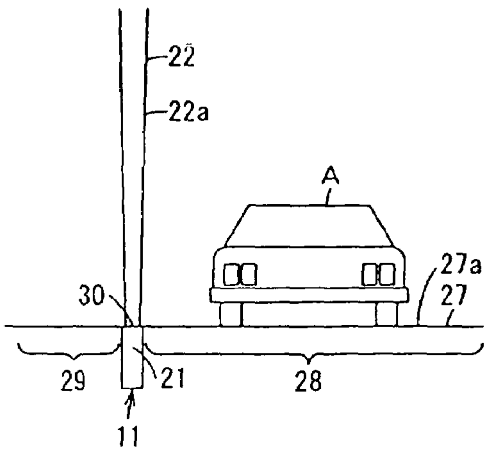
FIG. 12 is a diagram showing a use status of a road indication device according to the seventh embodiment of the present invention.

FIG. 10 shows a road indication device according to the sixth embodiment of the present invention. FIG. 10 shows an elliptical light projected from the light projection unit 21. The light 22 from the lamp 14 becomes elliptical at an irradiation plane due to the shape of the lens 17 of the light projection unit 21 of the road-guidance indicating device 11. For example, the light 22 of such irradiation form can be obtained with the lens 17 of form like a revolution body rotated the semi-cylindrical shape centering on the lamp. In this embodiment, the light 22 is irradiated in a manner that the major axis of projected light shape is directed along the passing direction F of the road 27 and the minor axis is directed along the cross section of the shoulder 29. By using this configuration, since the light pillar 22*a* of the light 22 seen by the driver is seen as a curtain along the shoulder 29 of the road 27, the boundary 30 of the road 27 can be spatially recognized Seventh Embodiment FIG. 12 shows a road indication device according to the seventh embodiment of the present invention. As shown in FIG. 12, the road indication device 11 is buried in the pavement 27*a* of the road 27 according to the position of the boundary 30, and thus the light 22 is projected upwards from the pavement 27*a* of the road 27. In this case, the snow covering the protection plate 20 of the projection opening 12 of the road-guidance indicating device 11 is melted due to the heat created by the lamp 14, a projection light amount of the light 22 can be maintained. In addition, since the post 31, etc. for mounting the road indication device 11 is not stood above the pavement 27*a* of the road 27, the natural landscape can be maintained. Furthermore, the maintenance can be easier because the road indication device 11 is located at a low position.

In addition to burying the road indication device 11 in the pavement 27*a* of the road 27, the road-guidance indicating device 11 can also be arranged with a post of a guard rail formed on the shoulder 29.

Eighth Embodiment

Figure 13:
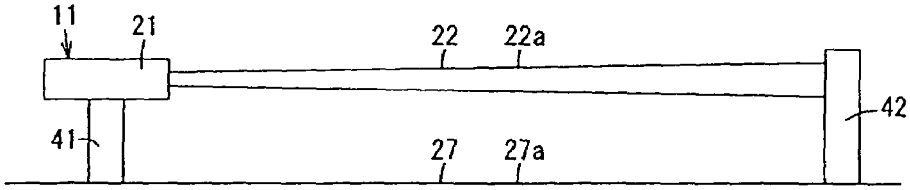
FIG. 13 is a diagram showing a use status of a road indication device according to the eighth embodiment of the present invention.

FIG. 13 shows a road indication device according to the eighth embodiment of the present invention. FIG. 13 shows an example of the road indication device 11 used in a guidance indicator for a crossing or a signal of temporary stop. A post 41 is erected at one side of the road 27. The road indication device 11 for projecting the light 22 to the other side of the road 27 is horizontally mounted atop the post 41, i.e., the road indication device 11 is set in a manner that the light projection opening 12 is directed towards the other side of the road 27. A light receiving unit 42 is erected at the other side of the road 27 for receiving the light 22 projected from the road indication device 11.

In this way, since the light pillar 22*a* of the light 22 projected from the road indication device 11 crosses over the road 27 in the horizontal direction, the road indication device 11 can be used to guide and indicate a crossing or a signal of temporary stop.

Ninth Embodiment

Figure 14:
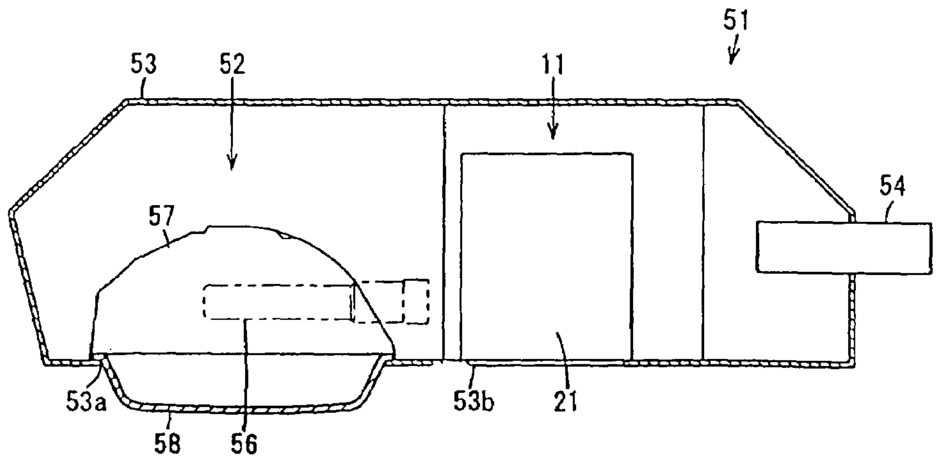
FIG. 14 is a cross-sectional view of an illumination device comprising the road indication device according to the ninth embodiment of the present invention.
Figure 15:
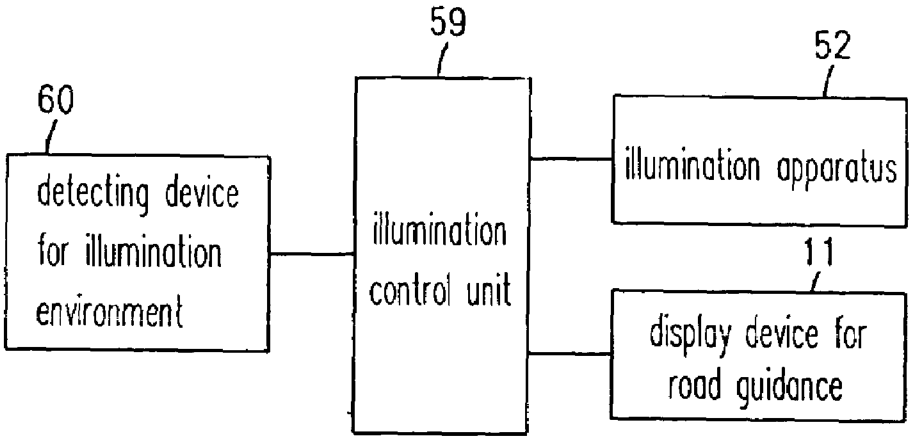
FIG. 15 is a block diagram of the road indication device of FIG. 14.

FIGS. 14 and 15 shows a road indication device according to the ninth embodiment of the present invention. As shown in FIG. 14, a usual illumination apparatus 52 and the road indication device 11 integrated together as an illumination device 51, and the illumination device 51 is installed on the post 31 erected on the shoulder 29 of the road 27.

The illumination apparatus 52 comprises an apparatus body 53. An installation part 54 for installing the illumination device 51 to the post 31 is formed at the base end of the apparatus body 53. The illumination apparatus 52 for mainly illuminating the driveway of the road 27 is arranged inside the front end of the apparatus body 53. The road-guidance indicating device 11, for projecting the light 22 to the boundary 30 between the driveway 28 and the shoulder 29 of the road 27, is arranged inside the base end of the apparatus body 53.

The illumination apparatus 52 comprises a lamp 56, a reflection mirror 57 and a cover 58. The lamp 56 can be a metal halide lamp, etc. for example. The reflection mirror 57 is used to reflect the light of the lamp 56 towards the road 27 below. The cover 58 is installed onto a lower opening 53*a* of the apparatus body 53 and is made of glass that is subjected to an enhancement process (including thermal process).

The road indication device 11 is set in the apparatus body 53 so that the light projection opening 12 is adjacent to the lower opening 53*b* of the apparatus body 53. Since the apparatus body 53 is thin along the up-and-down direction, the light projection unit 21 having the optical system 18 and the ballast 19 are separated and the ballast 19 is arranged in a lateral space next to the light projection unit 21.

Referring to FIG. 15, lighting the illumination apparatus 52 and the road indication device 11 is controlled by an illumination control unit 59. The illumination control unit 59 functions to alternatively light the illumination apparatus 52 and the road-guidance indicating device 11 according to a detection of an illumination environment detecting device 60 that detects an ambient brightness and an environment condition (such as weather condition). For example, if it gets dark and not in a bad weather condition, such as snowfall, rainfall, or fog, etc., the illumination apparatus 52 is turned on and the road indication device 11 is turned off. In addition, when in the bad weather condition, such as snowfall, rainfall, or fog, etc., the illumination apparatus 52 is turned off and the road indication device 11 is turned on. In other words, when the illumination apparatus 52 is turned off, the road-guidance indicating device 11 is turned on, and vice-versa.

The illumination environment detecting device 60 utilizes an illuminometer arranged in the apparatus body 53 and a brightness photometer, etc. to detect the ambient brightness, and utilizes an atmosphere transmissometer, etc. arranged outside the apparatus body 53 to detect a snowfall amount, a rainfall amount and a fog density, etc.

Then, when it gets dark and not in a bad weather condition, such as snowfall, rainfall, or fog, etc., only the illumination apparatus 52 is turned on to illuminate the road 27.

On the other hand, in the bad weather condition, such as snowfall, rainfall, or fog, etc., only the road indication device 11 is turned on to guide and indicate the boundary 30 between the driveway 28 and the shoulder 29 by the light pillar 22*a* of the light 22 from the road-guidance indicating device 11 to the pavement 27*a* of the road 27. When the illumination apparatus 52 is turned on in the bad weather, the light will irradiate the snow, etc. in a coverage area under the illumination apparatus 52 to create alight curtain. At this time, since the illumination apparatus 52 is turned off, the occurrence of light curtain and disability glare can be effectively reduced.

As described above, since illumination device 51 includes the illumination apparatus 52 to illuminate the pavement 27*a* of the road 27 and the road-guidance indicating device 11 to project the light towards the pavement, the usual road illumination and the guiding indication for bad weather, etc. can be alternatively switched by one illumination device 51.

For example, by alternatively turning on the illumination apparatus 52 and the road indication device 11 according to the ambient brightness and the environment condition (such as the weather condition), the usual road illumination and the guiding indication for bad weather, etc. can be alternatively switched by one illumination device 51.

Tenth Embodiment

Figure 16:
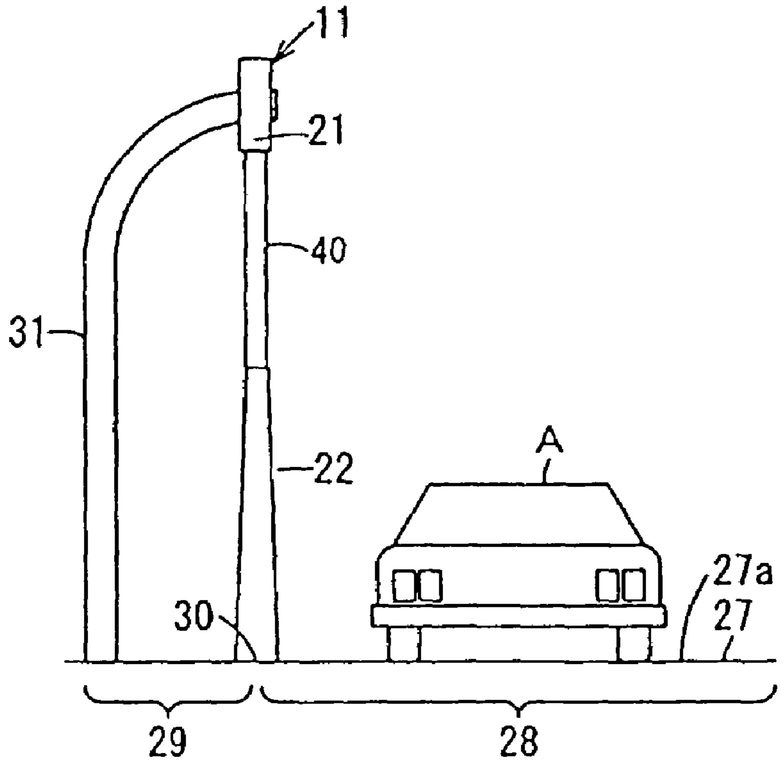
FIG. 16 is a diagram showing a use status of a road indication device according to a tenth embodiment of the present invention.

FIG. 16 shows a road indication device according to the tenth embodiment of the present invention. FIG. 16 shows of the road indication device in use. As shown in FIG. 16, on the post 31 or the light projection unit 11, a light guiding device 40 is installed at a position where a portion or all of the light 22 projected from the light projection unit 11 are guided, and is protruded from the lower end of the light projection unit 11. The light guiding device 40 comprises a light pipe, a light guide and an optical fiber. A sharpened light beam can be irradiated by installing the light guide device 40. In addition, by constructing the light guiding device 40 in a manner that the light is irradiated from the side face of the light guiding device 40, the light guiding device 40 can also gleam when the driver watches it.

In addition, in a bad weather condition, such as snowfall, rainfall or fog, etc., the lamp 14 of the light projection unit 11 is fully lit since the guiding indication using only light guiding device 40 is insufficient. By lighting the lamp 14, the light of the lamp 14 is reflected by the reflection mirror 15, and the reflection light passes through the opening of the aperture 16 for cutting the expanse of the light 22 that expands to the surrounding. Then, the reflection light is focused by the lens 17 to render the light substantially parallel along the light axis. The light 22 is then projected towards the boundary 30 between the driveway 28 and the shoulder 29 through the light projection opening 12 and the light guiding device 40.

Since the projected light irradiated to the snow, the rain and the fog, etc. and the snow, the rain and the fog glow, a light pillar from the light projection unit 11 to the paving 27*a* can be visually identified, so that the boundary 30 between the driveway 28 and the shoulder 29 can be guided and indicated by the light pillar 22*a*. Therefore, the driver can drive the car A on the driveway 28 safely while confirming the boundary 30 between the driveway 28 and the shoulder 29, and thereby confirming the route of the road 27 by the light pillars 22*a* set with a predetermined distance along the road 27.

Since the luminosity of the light pillar 22*a* of the light 22 is equal to or larger than the peak luminosity of the headlight of the car A running on the road 27, the light pillar 22*a* of the light 22 can be affirmatively recognized even though the light of the headlight is irradiated to the light pillar 22*a* of the light 22.

In the bad weather such as snowfall, the rainfall and the fog, etc., the light of the lamp is condensed onto the road by the lens 17, so that a light with a peak luminosity of 30000 cd or more is projected from the light projection unit. Namely, by projecting a light with a peak luminosity equal to or larger than the peak luminosity of the headlight of the car running on the road, the light output can be high and a thick light pillar can be formed. In addition, since the light pillar 22*a* of the light 22 can be affirmatively identified even though the light of the headlight of the car A is irradiated to the light pillar 22*a* of the light 22, the visibility of the light pillar 22*a* can be improved in the bad weather and the boundary 30 on the road 27 can be precisely guided and indicated. In addition, in the weather condition other than the bad weather such as the snowfall, the rainfall and the fog, the position of the boundary 30 on the road 27 can be affirmatively guided and indicated by the glowing light guiding device 40. When the weather condition is not bad, the lamp 14 can be adjusted in a manner to only glow the light guiding device 40. In this manner, the driver can be guided to recognize the shoulder. Furthermore, the lamp 14 is controlled according to the traffic and the time zone in a manner that the lamp 14 is adjusted to turn on from the evening to the midnight and the light output is reduced from the midnight to the morning. In this way, the energy consumption can be saved.

Eleventh Embodiment

Figure 17:
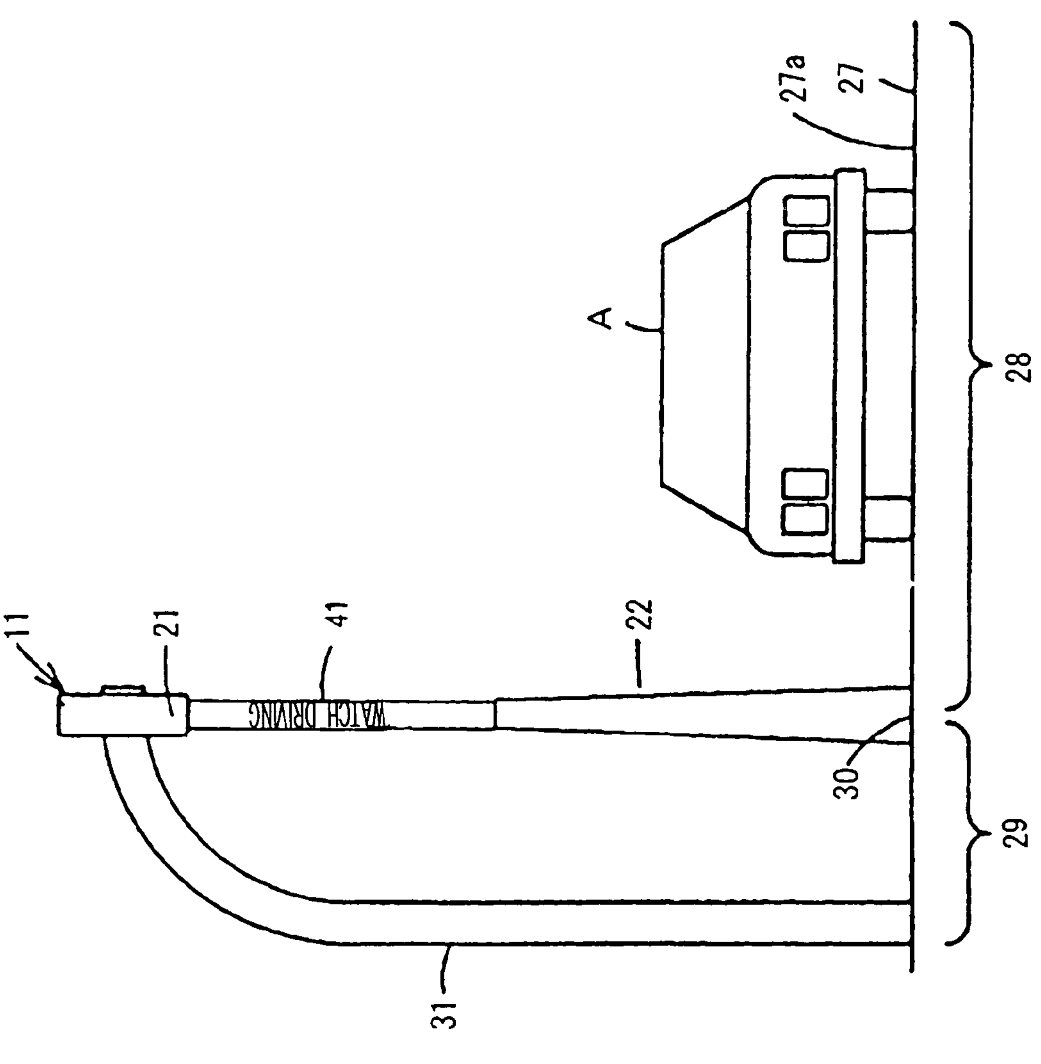
FIG. 17 is a diagram showing a use status of the road indication device according to the eleventh embodiment of the present invention.

FIG. 17 shows a road indication device according the eleventh embodiment of the present invention. As shown in FIG. 17, an indication, such as "WATCH WHILE DRIVING", is provided on a side face of the light guiding device 41, and only the indication portion gleams. This can attract the attention of the driver.

Twelfth Embodiment

Figure 18:
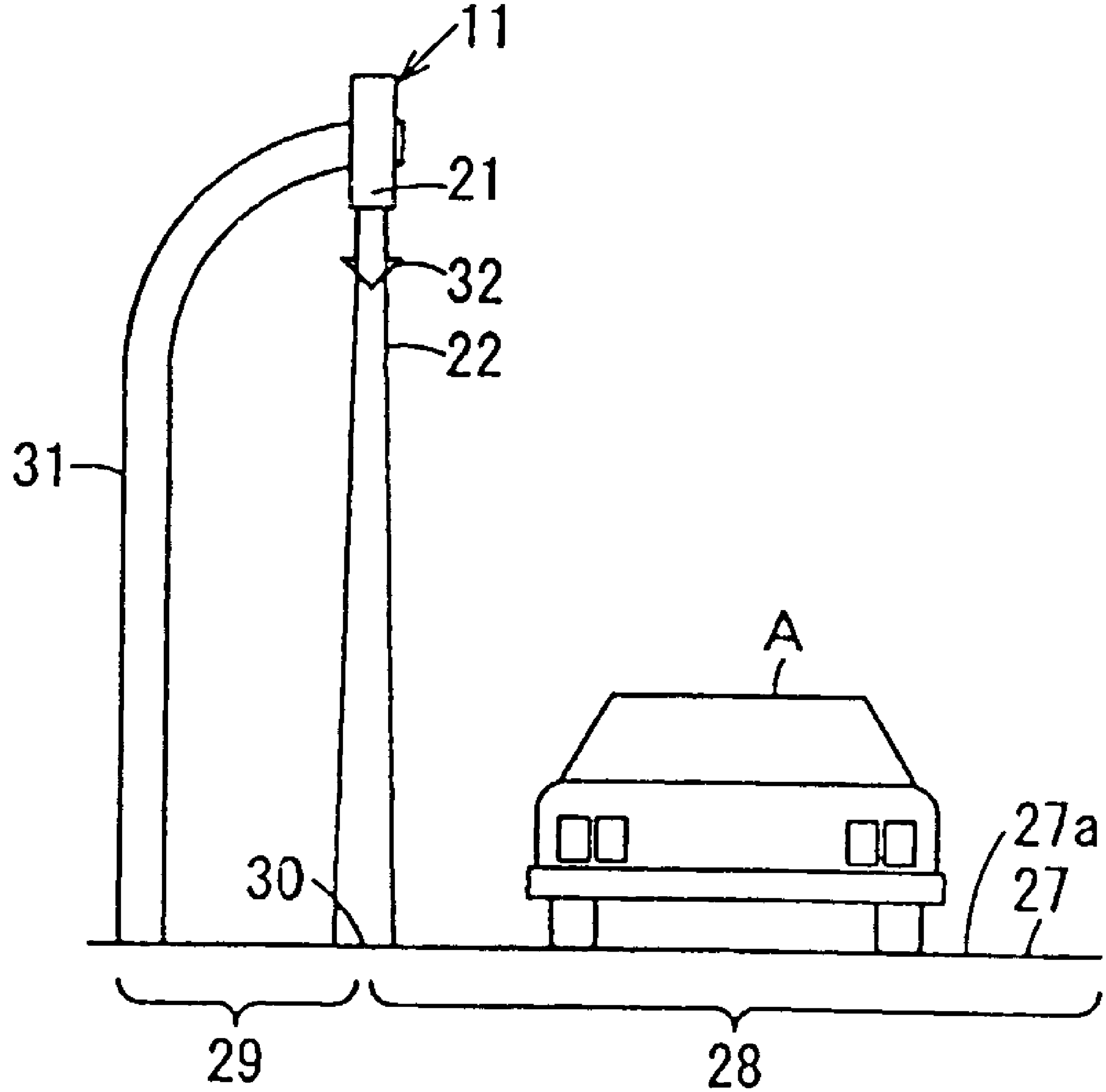
FIG. 18 is a diagram showing a use status of the road indication device according to the twelfth embodiment of the present invention.

FIG. 18 shows a road indication device according to the twelfth embodiment of the present invention. As shown in FIG. 18, the arrow sign (plate sign) 32 whose front end, i.e., lower end is formed in an arrow shape is installed at a position that is illuminated by a portion of the light 22 projected from the light projection unit 11, and is protruded from the lower end of the light projection unit 11. The arrow sign 32 is installed in a manner that a portion of light 22 is irradiated to the plate surface facing the driving direction where the car A runs on the driveway 28. The surface of the arrow sign 32 is coated with a reflection material, or the arrow sign 32 can be formed with a reflection material.

Figure 19:
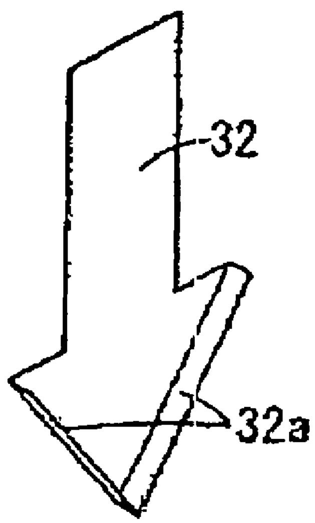
FIG. 19 is a perspective view showing an arrow sign used together with the road indication device according to the twelfth embodiment of the present invention.

As shown in FIG. 19, by bending a reflection portion 32*a* from the edges of an arrow portion at the lower end of the arrow sign 32 to a surface where the light 22 is irradiated there to, the reflection light reflected by the reflection portion 32*a* is irradiated to the surface of the arrow sign 32. As a result, the arrow sign 32 becomes brighter and the visibility can be further improved.

Thirteen Embodiment

Figure 20:
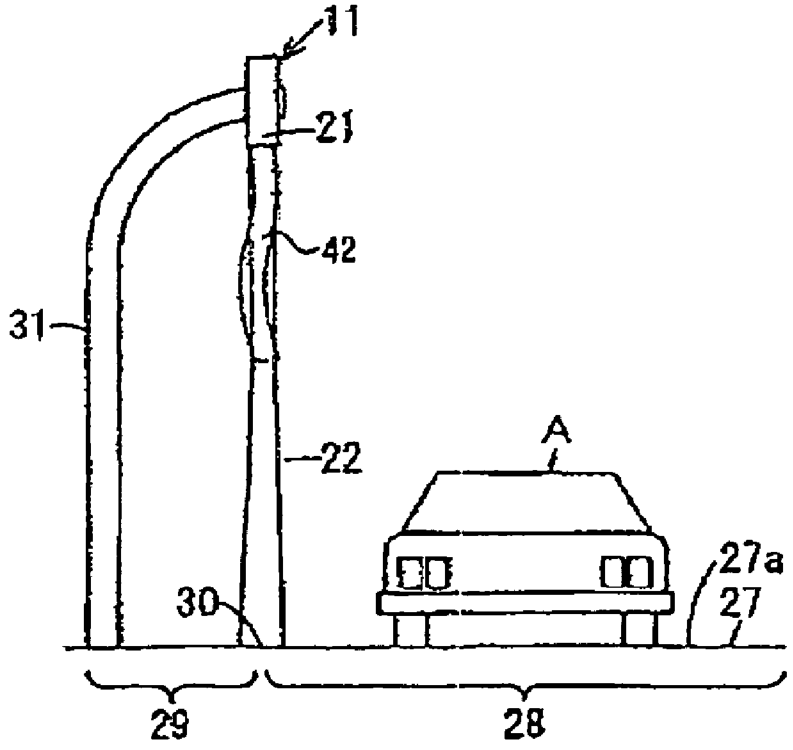
FIG. 20 is a diagram showing a use status of a road indication device according to the thirteenth embodiment of the present invention.

FIG. 20 shows a road indication device according to the thirteenth embodiment of the present invention. As shown in FIG. 20, a ribbon 42 is installed at a position that is illuminated by a portion of the light 22 projected from the light projection unit 11, and is protruded from the lower end of the light projection unit 11. The ribbon 42 is installed in a manner that a portion of light 22 is irradiated to the plate surface facing the driving direction where the car A runs on the driveway 28. The surface of the ribbon 42 is coated with reflection material, or the arrow sign 32 can be formed with reflection material. The weight becomes light by using the ribbon 42??, and the ribbon 42 can be used as a vane because the ribbon 42 can detect the wind, etc.

Fourteenth Embodiment

Figure 21:
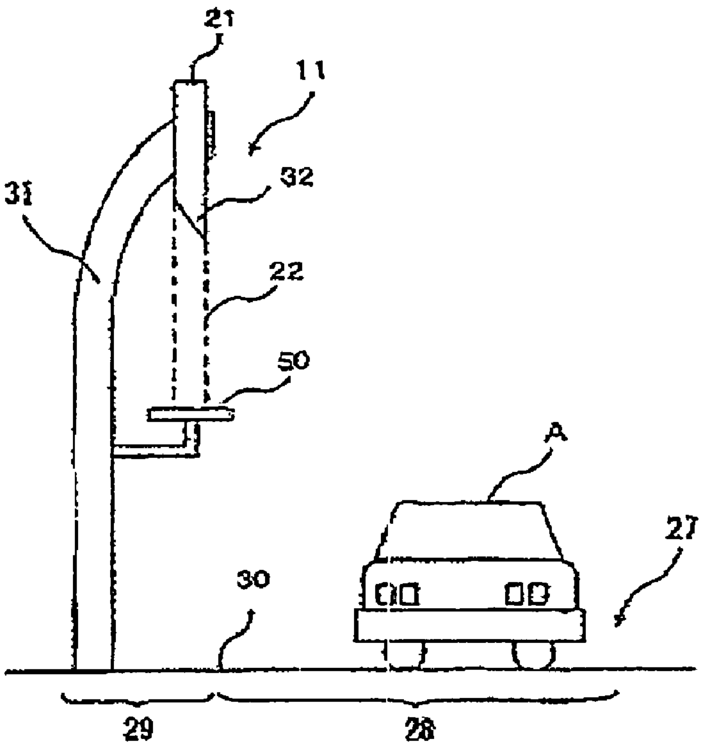
FIG. 21 is a diagram showing a use status of a road indication device according to the fourteenth embodiment of the present invention.

FIG. 21 shows an appearance diagram of a road indication device according to the fourteenth embodiment of the present invention. As shown in FIG. 21, the road-guidance indicating device 11 comprises a light projection unit 21 and a light control member 50. An arrow sign 32 is installed in front of the road-guidance indicating device 11. Therefore, the light projection unit 21 is located behind the arrow sign 32. The light projection unit 21 and the light control member 50 are installed on a post 31. The post 31 is erected on the shoulder 29 of the road 27. Namely, the driveway 28 and the shoulder 29 are formed along a boundary 30 on the road 27, and the post 31 is stood on the shoulder 29. The post 31 is formed in a manner that its upper end is bent towards the side of the driveway 28, and a plurality of posts 31 is erected on the shoulder 29 at a predetermined interval.

The light projection unit 21 for projecting the light towards the boundary 30 of the pavement 27*a* of the road 27 is installed at the upper end of each post 31, and the light projection opening is directed downwards. The light control member 50 is arranged between the pavement 27*a* and the light projection unit 21. The light control member 50 is installed in a manner to reduce the possibility of the light 22 (irradiated from the light projection unit 21 towards the paving 27*a*) from reaching the pavement 27*a* of the road 27. In FIG. 21, the light control member 50 is installed in a direction to reflect the light 22 to the light projection unit 21. In this case, the reflection light reflected by the light control member 50 is reflected towards the light projection unit 21.

For preventing children from directly gazing the high intensity of light at the beam center the light source of the light projection unit 21, the installation position of the light control member 50 is positioned at 1.5 m or more above the pavement 27*a* of the road, where hands of children cannot reach. If the snowfall amount or the surrounding structure is generally 1.5 m or more, the children cannot gaze the central portion of the light source.

The surface of the light control member 50 facing the light projection unit 21 is formed with a mirror surface capable of reflecting light, or a light shielding surface for absorbing light. When the surface of light control member 50 facing the light projection unit 21 is formed with the mirror surface, the boundary 30 of the road can be more clear because the light amount between the light projection unit 21 and the light control member 50 is increased. In general, since the arrow sign 32 is set in front of the light projection unit 21 opposite to the driving direction of the car A, the reflection light from the light control member 50 is irradiated to the arrow sign 32, and the visibility of the arrow sign 32 can be increased.

On the other hand, when the surface of light control member 50 facing the light projection unit 21 is formed with a black surface for absorbing light, the leakage light reflected by the light control member 50 can be prevented from reaching the paving of the road 27 since the light from the light control unit 21 is absorbed and shielded by the light control member 50. Therefore, the occurrence of disability glare and discomfort glare, etc. due to the reflected light from the light control member 50 can be prevented.

As described above, the direct light and the reflection light from the light projection unit 21 can be prevented from reaching the pavement of the road 27, and the boundary 30 of the road 27 can be recognized by the light between the light projection unit 21 and the light control member 50. In this way, the driver of the car A can be guided by the light between the light projection unit 21 and the light control member 50 so as to drive the car A safely.

According to the fourteenth embodiment of the present invention, since the light from the light projection unit 21 is reflected towards the light projection unit 21 by the light control member 50, the reflected light from the light control member 50 can be prevented from reaching the pavement of the road, and the occurrence of disability glare or discomfort glare, etc. due to the reflected light from the light control member 50 can be reduced. In addition, the visibility of the road boundary can be improved since the light amount between the light projection unit 21 and the light control member 50 is increased. Furthermore, when the arrow sign is arranged in front of the light projection unit 21, the boundary 30 of the road 27 can be guided by not only the light between the light projection unit 21 and the light control member 50 but also the arrow sign 32 because the arrow sign 32 is irradiated by the reflected light. Additionally, since the light control member 50 is positioned at 1.5 m or more above the pavement of the road, it prevents the occurrence of disability glare or discomfort glare, etc. when gazing the light projection unit 21 from below.

Fifteenth Embodiment

Figure 22:
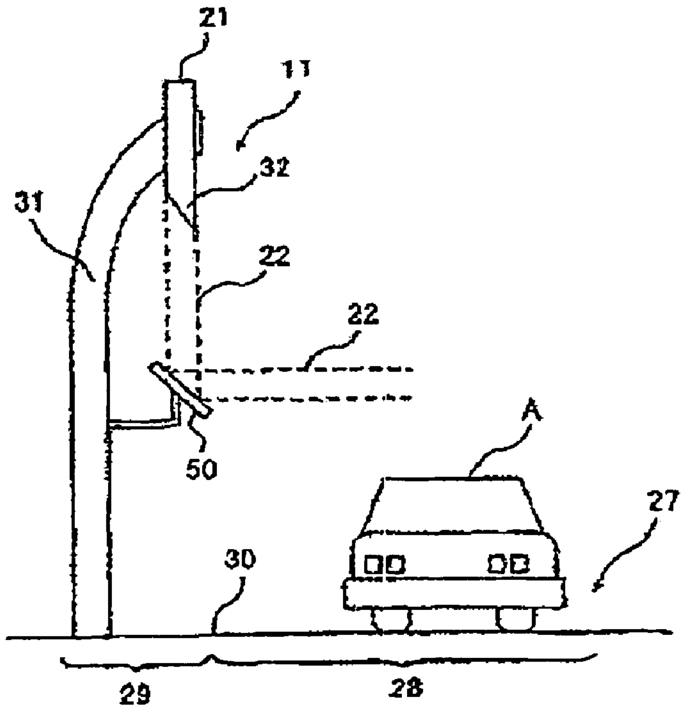
FIG. 22 is a diagram showing a use status of a road indication device according to the fifteenth embodiment of the present invention.

FIG. 22 is view of a road indication device according to the fifteenth embodiment of the present invention. According to the fifteenth embodiment, the light control member 50 is installed in a manner that an installation angle of the light control member 50 is set to an angle that the reflected light from the light control member 50 is irradiated along the crossing direction of the road 27.

In FIG. 22, the reflected light from the light control member 50 is irradiated along the crossing direction of the road 27. For example, the reflected light is irradiated along the crossing direction of the road 27 at locations of pedestrian crossing, an intersection, a stop line, a railroad crossing, etc. This way the attention of the driver can be attracted to notice the pedestrian crossing, the intersection, the stop line and the railroad crossing, etc. In addition, by changing the color of the reflected light, the intersection, the stop line and the railroad crossing, etc. can be recognized. For changing the color of the reflected light, a multi-coated film or a filter for determining the color of the reflected light is formed on the mirror surface of the light control member 50.

According to the fifteenth embodiment of the present invention, in addition to the effects described in the first embodiment, the attention of the driver can be drawn to notice the pedestrian crossing, the intersection, the stop line and the railroad crossing, etc. because the reflected light is irradiated along the crossing direction of the road 27. In addition, the degree of selection of colors of the reflected light is large allowing selection of a suitable color for improving the visibility because the reflected light with a suitable color can be projected from the light control member 50. For example, the color of the reflected light of the pedestrian crossing, the intersection, the stop line and the railroad crossing, etc. can be corresponding changed in order to draw the attention of the driver to notice these locations.

Sixteenth Embodiment

Figure 23:
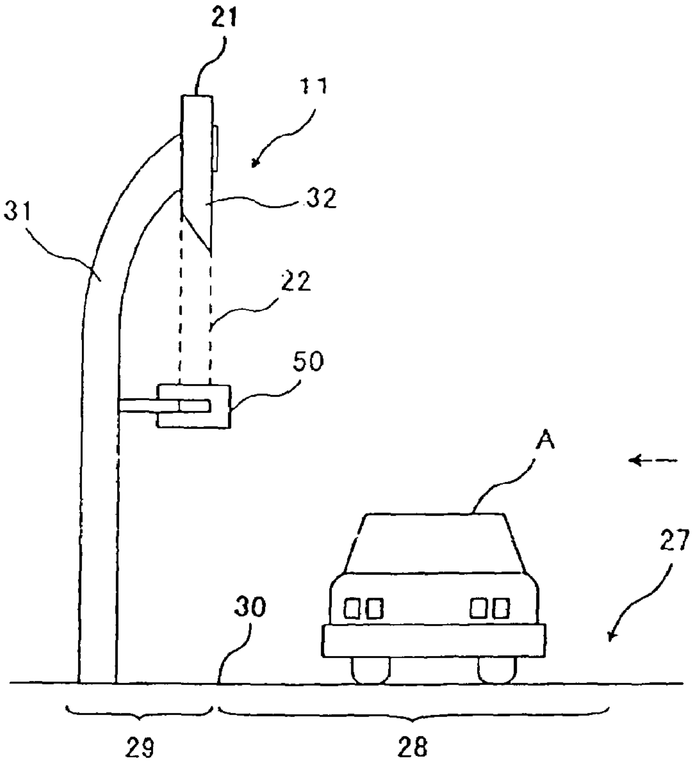
FIG. 23 is a diagram showing a use status of a road indication device according to the sixteenth embodiment of the present invention.

FIG. 23 is a view of a road indication device according to a sixteenth embodiment of the present invention. In FIG. 23, the installation angle is set to an angle that the reflection light from the light control member 50 is irradiated parallel to the road 27. FIG. 23 shows a situation that the reflection light is irradiated from a front direction to a back direction with respect to the drawing. Since the road indication device 11 is installed on the posts 31 that are erected along the road curve of the road 27 with a predetermined distance, the reflected light from the light control member 50 of each road indication device 11 can guide and indicate the road curve of road 27.

Figure 24:
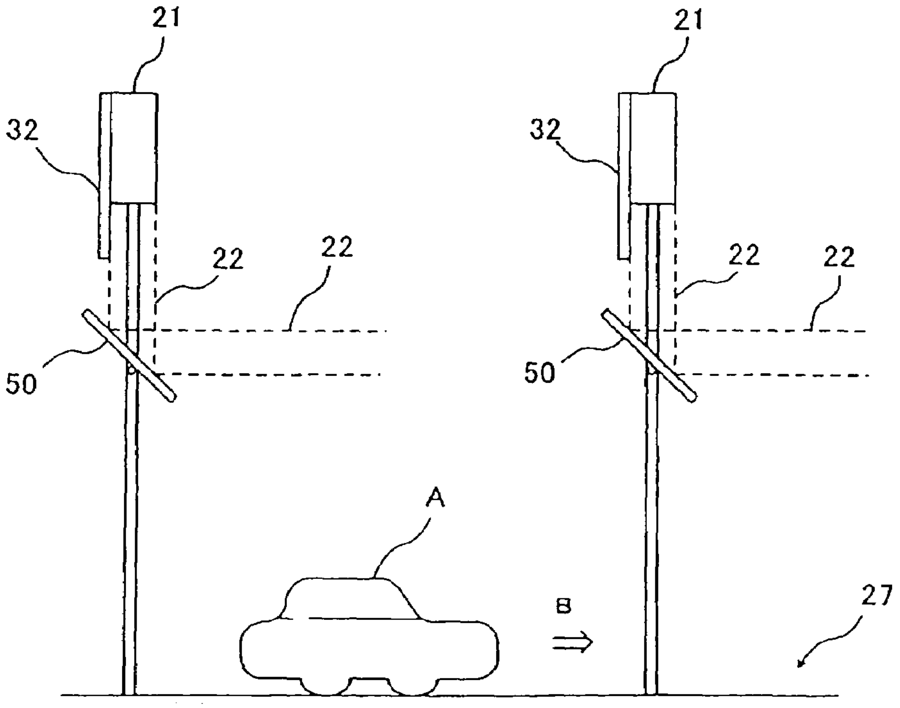
FIG. 24 is a side-view diagram viewed from a arrow direction in FIG. 23.

FIG. 24 is a side-view of a road indication device viewed from the direction of the arrow in FIG. 23. The light reflected by the light control member 50 is irradiated parallel to the road 27 is directed along the driving direction B of the car A. The reflected light from the light control member 50 can be also irradiated along a reverse direction relative to the driving direction B of the car A. However, it is preferable to reflect the reflection light 22 along the driving direction B of the car A because the reflected light will not directly incident to the eyes of the driver of the car A which would otherwise make the driver feel dizzy.

According to the sixteenth embodiment of the present invention, in addition to the effects described in the first embodiment, the road curve of the road 27 can be quickly identified as the driver's eyes can be effectively guided by the reflected light from the light control member 50 being irradiated parallel to the road 27 (the longitudinal direction of the road 27).

As described above, the direction of the reflected light from the light control member 50 is irradiated in a parallel direction (longitudinal direction) or in a crossing direction of the road 27. However, the direction of the reflected light from the control member 50 can be changed to an upward direction or tilted from the horizontal direction according to the requirement. In addition, the light control member 50 can be constructed in a manner that the angle of the light control member 50 is adjustable.

Seventeenth Embodiment

Figure 25:
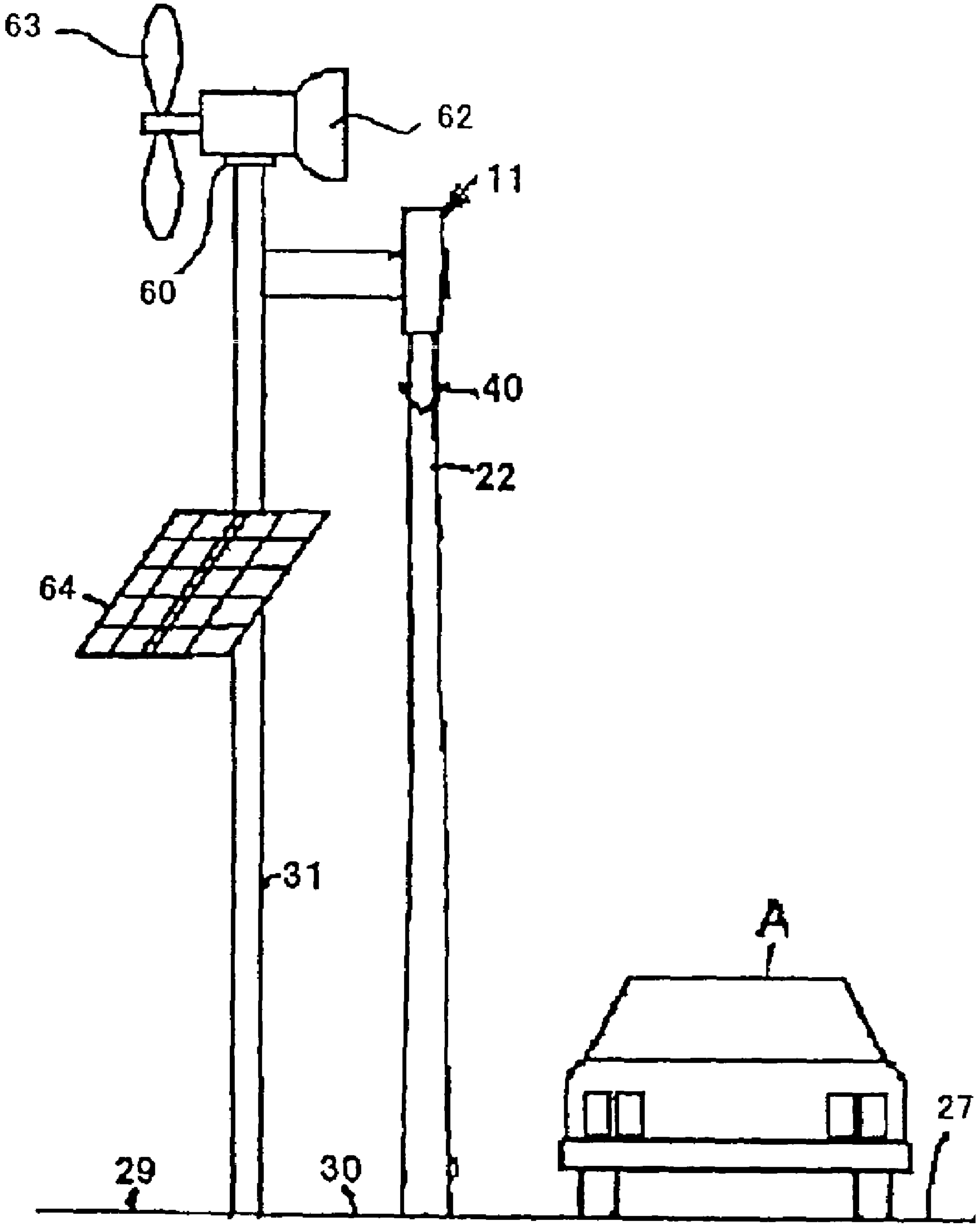
FIG. 25 is a diagram showing a use status of a road indication device according to the seventeenth embodiment of the present invention.
Figure 26:
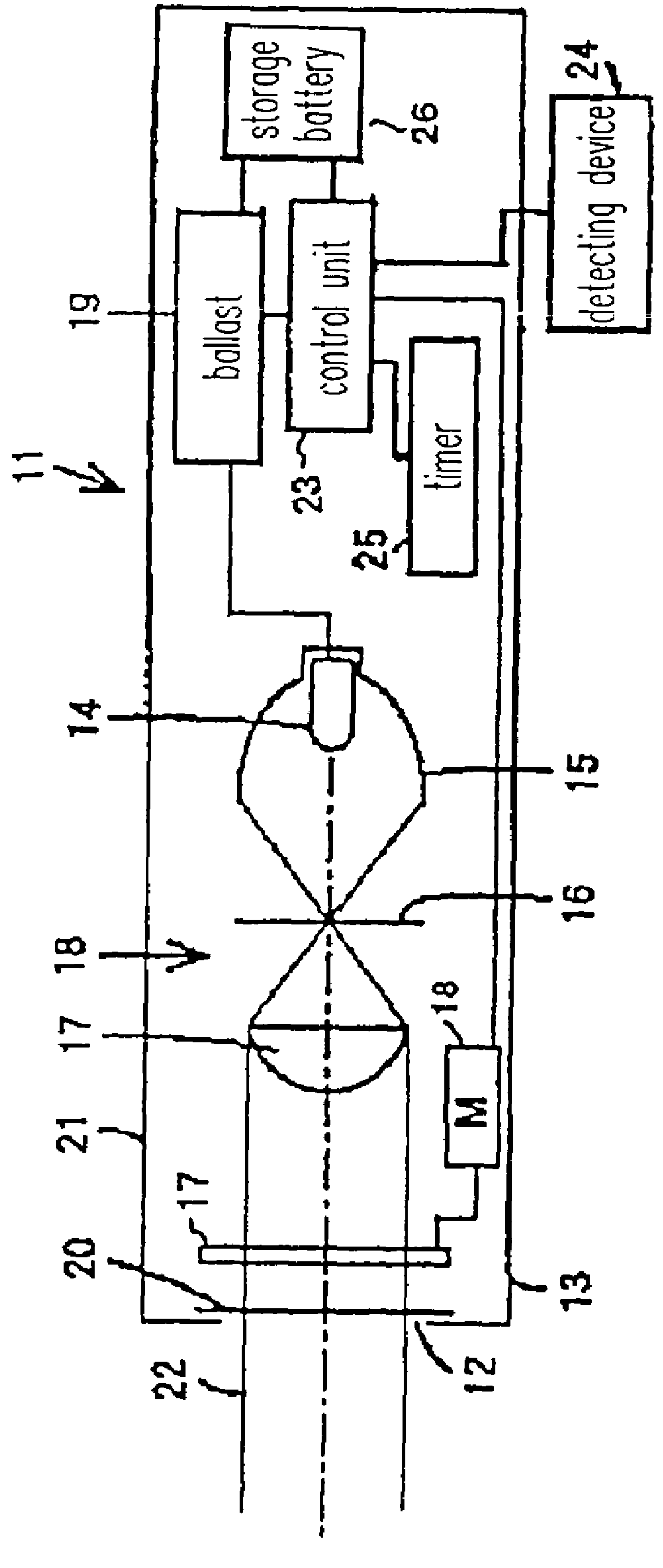
FIG. 26 is a structure diagram of the road indication device according to the seventeenth embodiment of the present invention.

FIGS. 25 and 26 shows a road indication device according to a seventeenth embodiment of the present invention. FIG. 25 is used to describe a road indication device of the present invention in use and FIG. 26 shows a light projection unit of the road indication device.

In FIG. 25, a wind driven generator 60 having a windmill 63 and a generating device 62 as well as a solar generator 64 are installed atop the post 31. The wind driven generator 60 uses the rotation of the windmill 63 to generate power by using the generating device 62. The electrical powers generated by the wind driven generator 60 and the solar generator are 34 are supplied to the light projection unit 21.

As shown in FIG. 26, the light projection unit 21 comprises a case 13 having a light projection opening 12 for projecting the light at one end along a light axis. A lamp 14 such as a metal halide lamp, an optical system 18, a ballast 19, a control unit 23, a timer 25 and a storage battery 26 are installed in the case 13, a. The optical system 18 comprises a reflection mirror 15 for focusing and reflecting the light from the lamp 14 along a direction of a light axis of the reflection mirror 15, and aperture 16 for forming a circular opening at the focus of the reflection light reflected by the reflection mirror 15, a lens 17 for condensing the light passing through the opening of the aperture 16 parallel with the direction of the light axis, and a rotational filter 17 capable of changing the color of the light. The ballast (light control member) 19 serves as a lighting device to light the lamp 14. The control unit 23 controls the ballast 19. The storage battery 26 supply power to the ballast 19 and the control unit 23. The light projection opening 12 of the case 13 is covered by a protection plate 20 with transmittance that is made of glass or resin. The light projection unit 21 is constructed to include the case and the optical system 18, and projects a light 22 having a peak brightness equal to or larger than 30000 cd. The color of the light 22 can be changed by the filter 17, and can be white or a color adding a background color.

The ballast 19 is controlled by the control unit 23, and the control unit 23 is capable of controlling a light output, including turning on and off the lamp 14, according to the environment conditions, such as snowfall, rainfall, fog and traffic, etc. For example, when the detecting device 24 detects a snowfall amount (or a rainfall amount and a fog density, etc.), the lamp 14 is usually turned on with a rated output when the snowfall amount exceeds a predetermined amount. The control units 23 can control the lamp 14 to reduce its light output when the snowfall amount decreases. This control scheme can be executed by a program set in previously conducted experiments. In addition, for example, according to time information from the timer 25, the lamp 14 is usually lit from the evening to the midnight, and the lamp 14 is controlled according to the traffic volume and the time zone in a manner that the light output of the lamp 14 is reduced from the midnight to the morning when the traffic of cars, etc. is small. Furthermore, the detecting device 24 used in the environment detection can utilize an environment transmissometer. The laser beam is irradiated from the light projection unit 21 to the receiver, and the surrounding environment status, such as the snowfall amount, the rainfall amount and the fog density, etc. can be found from a ratio of the light amount reaching the receiver.

The detecting device 24 can be also in connection with the wind driven generator 60 and the solar generator 34 to detect the surrounding environment. In this way, when the weather condition is detected to be suitable for generating the solar power, the electrical power generated by the solar generator 64 is stored in a storage battery. In addition, when wind is detected by the wind driven during the snowfall, a stormy weather such as snowstorm, and the lamp 14 of the light projection unit 21 is lit by the electrical power generated by the wind driven generator 60. The projected light irradiates the snowfall during snowing, and the rainfall during the rain, and the fog, etc., and the snow, the rain and the fog glisten, which can be visualized as a light pillar from the light projection unit 21 to the pavement of the road 27. Therefore, the driver driving the car A on the road 27 can easily identify the boundary between the road 27 and the shoulder 29 by the light pillars 22 of the light 22 formed with a predetermined distance along the road 27, while confirming the route of the road 27.

In the night other than the bad weather, even though the lamp 14 of the light projection unit 11 is adjustably lit, the visibility of the arrow sign 40 is still good, and the driver who driving the car A on the road 27 can confirm the boundary between the road 27 and the shoulder 29 by the arrow signs 40 formed with a predetermined distance along the road 27, while confirming the route of the road 27. Therefore, the lamp 14 can be adjustably lit by only the electrical power stored in the storage battery 26.

While the present invention has been described with a preferred embodiment, this description is not intended to limit our invention. Various modifications of the embodiment will be apparent to those skilled in the art. It is therefore contemplated that the appended claims will cover any such modifications or embodiments as fall within the true scope of the invention.

What is claimed is:

1. A road indication device, comprising:

a light projection unit, arranged above a boundary of a carrigeway, for projecting a light towards the carrigeway, wherein a peak luminosity of the light is equal to or larger than 30000 cd; and a light guiding device, installed outside of the light projection unit and arranged at a light projection side of the light projection unit to be visible to a driver, and comprising a light pipe, a light guide and an optical fiber.

2. The road indication device of claim 1, further comprising an arrow sign whose backside is formed on the light projection unit so that the arrow sign is directed to the boundary of the carrigeway.

3. A road indication device, comprising:

a light projection unit, arranged above a boundary of a carrigeway, for projecting a light towards the carrigeway, wherein a peak luminosity of the light is equal to or larger than 30000 cd; and a reflection member, installed outside of the light projection unit and arranged at a light projection side of the light projection unit, and comprising an arrow sign that includes a reflection portion bended from edges of an arrow portion at a lower end of the arrow sign to a surface where the light is irradiated there to, while a reflection light reflected by the reflection portion is irradiated to a surface of the arrow sign.

4. The road indication device of claim 3, further comprising an arrow sign formed on the light projection unit, the arrow sign having a surface coated with a reflection material and illuminated by the light projection unit.

5. A road indication device, comprising:

a light projection unit, arranged above a boundary of a carrigeway, for projecting a light towards the carrigeway; and a light control member arranged between the light projection unit and the carrigeway to prevent the light irradiated from the light projection unit towards the road paving from reaching the carrigeway.

6. The road indication device of claim 5, wherein a surface of the light control member facing the light projection unit is formed by a mirror surface for reflecting the light.

7. The road indication device of claim 6, wherein the light control member is constructed in a manner that the angle of the light control member with respect to the light from the light projection unit is changeable such that the light reflected by the light control member is irradiated parallel to the road or along a crossing direction of the road.

8. The road indication device of claim 5, wherein the light control member is installed at a height equal to or larger than 1.5 m from the carrigeway.

* * * * *